(12) United States Patent
Hirata et al.

(10) Patent No.: US 11,582,725 B2
(45) Date of Patent: Feb. 14, 2023

(54) WIRELESS COMMUNICATION DEVICE AND WIRELESS COMMUNICATION METHOD

(71) Applicant: SONY CORPORATION, Tokyo (JP)

(72) Inventors: Ryuichi Hirata, Kanagawa (JP); Ren Sugai, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 16/982,587

(22) PCT Filed: Feb. 14, 2019

(86) PCT No.: PCT/JP2019/005226
§ 371 (c)(1),
(2) Date: Sep. 20, 2020

(87) PCT Pub. No.: WO2019/187734
PCT Pub. Date: Oct. 3, 2019

(65) Prior Publication Data
US 2021/0022118 A1    Jan. 21, 2021

(30) Foreign Application Priority Data
Mar. 28, 2018   (JP) .............................. JP2018-061174

(51) Int. Cl.
*H04W 72/04*    (2009.01)
*H04W 84/12*    (2009.01)

(52) U.S. Cl.
CPC ............ *H04W 72/04* (2013.01); *H04W 84/12* (2013.01)

(58) Field of Classification Search
None
See application file for complete search history.

(56) References Cited

U.S. PATENT DOCUMENTS

| 2014/0036889 | A1* | 2/2014 | Kim .................. H04W 72/0446 370/336 |
| 2016/0249383 | A1 | 8/2016 | Kwon et al. |
| 2017/0063509 | A1* | 3/2017 | Kim ...................... H04L 1/1685 |

(Continued)

FOREIGN PATENT DOCUMENTS

| CN | 107409328 A | 11/2017 |
| CN | 108432299 A | 8/2018 |

(Continued)

OTHER PUBLICATIONS

International Search Report and Written Opinion of PCT Application No. PCT/JP2019/005226, dated Mar. 26, 2019, 09 pages of ISRWO.

(Continued)

Primary Examiner — Kenny S Lin
(74) Attorney, Agent, or Firm — Chip Law Group

(57) ABSTRACT

[Problem] It becomes possible to realize more efficient communication in a wireless local area network (LAN) system.
[Solution] There is provided a wireless communication device that functions as an access point of a wireless LAN, including: a generation unit that generates a wireless signal in which allocation information for allocating a plurality of stations to one resource unit is stored; and a transmission unit that transmits the wireless signal to the stations.

13 Claims, 18 Drawing Sheets

(56) References Cited

U.S. PATENT DOCUMENTS

| | | | |
|---|---|---|---|
| 2017/0181102 A1 | 6/2017 | Bharadwaj et al. | |
| 2017/0374655 A1 | 12/2017 | Liu | |
| 2018/0041917 A1* | 2/2018 | Xi | H04L 1/1614 |
| 2018/0302858 A1 | 10/2018 | Son et al. | |
| 2018/0351725 A1* | 12/2018 | Kim | H04L 1/1685 |
| 2019/0306824 A1* | 10/2019 | Chu | H04B 7/0452 |
| 2021/0360694 A1* | 11/2021 | Pandian | H04W 74/0816 |

FOREIGN PATENT DOCUMENTS

| | | | |
|---|---|---|---|
| CN | 108702375 A | 10/2018 | |
| EP | 3267723 A1 | 1/2018 | |
| EP | 3396925 A2 | 10/2018 | |
| JP | 2017-011682 A | 1/2017 | |
| JP | 2017-055399 A | 3/2017 | |
| JP | 2018-537919 A | 12/2018 | |
| KR | 10-2018-0069928 A | 6/2018 | |
| KR | 10-2018-0088470 A | 8/2018 | |
| WO | 2016/141570 A1 | 9/2016 | |
| WO | 2017/106534 A1 | 6/2017 | |
| WO | 2017/111567 A2 | 6/2017 | |

OTHER PUBLICATIONS

Office Action for IN Patent Application No. 202017040757, dated Jun. 1, 2022, 06 pages of Office Action.

* cited by examiner

WIRELESS COMMUNICATION DEVICE AND WIRELESS COMMUNICATION METHOD

CROSS REFERENCE TO RELATED APPLICATIONS

This application is a U.S. National Phase of International Patent Application No. PCT/JP2019/005226 filed on Feb. 14, 2019, which claims priority benefit of Japanese Patent Application No. JP 2018-061174 filed in the Japan Patent Office on Mar. 28, 2018. Each of the above-referenced applications is hereby incorporated herein by reference in its entirety.

FIELD

The present disclosure relates to a wireless communication device and a wireless communication method.

BACKGROUND

A wireless communication system that performs communication between an access point (hereinafter, referred to as "AP" for convenience) and a station (hereinafter, referred to as "STA" for convenience) has been known. For example, a wireless local area network (LAN) that employs carrier sense multiple access/collision avoidance (CSMA/CA) has been widely known. In the wireless LAN, there is frequency multiplex communication in which transmission to a plurality of STAs or reception from a plurality of STAs is simultaneously performed using different frequency components for each STA as communication resources.

In the present document, orthogonal frequency division multiple access (OFDMA) in which frequency components are defined as resource units including one or more subcarriers (may be referred to as "subchannels", "resource blocks", "frequency blocks", or the like) and transmission to a plurality of STAs or reception from a plurality of STAs is simultaneously performed using the resource units as communication resources is mainly considered. By performing OFDMA communication, an overhead in a data packet is reduced and a throughput is improved.

CITATION LIST

Patent Literature

Patent Literature 1: JP 2017-55399 A
Patent Literature 2: JP 2017-11682 A

SUMMARY

Technical Problem

Here, there was a case where communication efficiency is not sufficient even with the OFDMA communication. More specifically, in the OFDMA communication, padding data is added so that data lengths of data addressed to a plurality of STAs with which simultaneous communication is performed are the same as each other.

For example, as illustrated in FIG. 12 of Patent Literature 1 described above, the padding data is added according to the longest data length of the data addressed to the plurality of STAs. Therefore, there is a possibility that padding data having a long data length will be added to a small amount of data depending on a traffic volume, such that communication efficiency is reduced. The technology disclosed in Patent Literature 1 improves communication efficiency by scheduling (in which resource unit, which frame is allocated to which STA), but this is not an essential solution to the above problem.

In addition, Patent Literature 2 also discloses a method of allocating time resources and frequency resources to transmission data addressed to the plurality of STAs, but a method of transmitting an acknowledgment to a data packet is a method similar to a conventional method. Therefore, it takes time to transmit the acknowledgment, such that there is a possibility that frequency utilization efficiency will be decreased.

Therefore, the present disclosure has been made in view of such a situation, and provides a noble and improved wireless communication device and wireless communication method capable of realizing more efficient communication in a wireless LAN system.

Solution to Problem

According to the present disclosure, a wireless communication device is provided that functions as an access point of a wireless local area network (LAN), the wireless communication device includes: a generation unit that generates a wireless signal in which allocation information for allocating a plurality of stations to one resource unit is stored; and a transmission unit that transmits the wireless signal to the stations.

Moreover, according to the present disclosure, a wireless communication method is provided that realizes an access point function of a wireless LAN, the wireless communication method includes: generating a wireless signal in which allocation information for allocating a plurality of stations to one resource unit is stored; and transmitting the wireless signal to the stations.

Moreover, according to the present disclosure, a wireless communication device is provided that functions as a station of a wireless LAN, the wireless communication device includes: a reception unit that receives a wireless signal in which allocation information for allocating a plurality of stations to one resource unit is stored; and a reception processing unit that performs reception processing of the wireless signal on the basis of the allocation information.

Moreover, according to the present disclosure, a wireless communication method is provided that realizes a station function of a wireless LAN, the wireless communication method includes: receiving a wireless signal in which allocation information for allocating a plurality of stations to one resource unit is stored; and performing reception processing of the wireless signal on the basis of the allocation information.

Advantageous Effects of Invention

As described above, according to the present disclosure, it becomes possible to realize more efficient communication in a wireless LAN system.

Note that the effect described above is not necessarily restrictive, and any effect set forth in the present specification or other effects that can be grasped from the present specification may be accomplished together with or instead of the effect described above.

DESCRIPTION OF EMBODIMENTS

Figure 1:
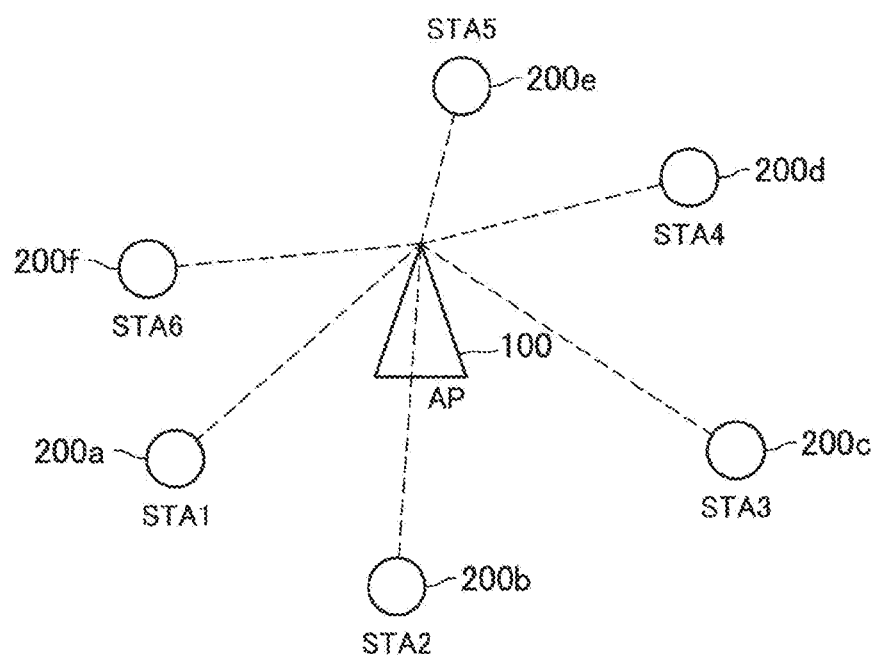
FIG. 1 is a diagram illustrating a configuration example of a wireless local area network (LAN) system according to the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will thus be omitted.

Note that a description will be given in the following order.
1. First embodiment
1.1. System configuration example
1.2. Device configuration example
1.3. Format example
1.4. Flow of processing
2. Second embodiment
3. Application example
3.1. First application example
3.2. Second application example
3.3. Third application example
4. Summary

1. FIRST EMBODIMENT 1.1. System Configuration Example

First, a configuration example of a wireless local area network (LAN) system according to a first embodiment of the present disclosure will be described with reference to FIG. 1.

As illustrated in FIG. 1, the wireless LAN system according to the present embodiment includes an access point (AP) 100 and a plurality of stations (STAs) 200 (STA 200a to STA 200f in FIG. 1).

The wireless LAN system according to the present embodiment can be installed at any place. For example, the wireless LAN system according to the present embodiment can be installed in an office building, a house, a commercial facility, a public facility, or the like. This wireless LAN system is assumed to conform to the IEEE 802.11 standard, but may conform to other communication schemes.

The AP 100 is a wireless communication device that is connected to an external network and provides communication with the external network to the STA 200. For example, the AP 100 is connected to the Internet, and provides communication between a device on the Internet or a device connected via the Internet and the STA 200.

A case where the AP 100 performs OFDMA communication with the STA 200a to the STA 200f or with a STA 200 selected from the STA 200a to the STA 200f is assumed. More specifically, the AP 100 realizes the OFDMA communication by allocating a resource unit including one or more subcarriers to each STA 200 as a communication resource and simultaneously communicating with the plurality of STAs 200 on a resource unit basis.

Here, the resource unit is a frequency component which is a minimum unit of a resource used for communication. More specifically, a plurality of subcarriers orthogonal to each other are arranged in one channel, and a plurality of resource units including one or more consecutive subcarriers are defined in the channel. A bandwidth of one channel can be, for example, 20 MHz, 40 MHz, 80 MHz, 160 MHz, or the like, but is not limited thereto. The number of subcarriers or the number of resource units in the channel may differ depending on the bandwidth of the channel. A bandwidth of the resource units (or the number of subcarriers) may be common or different for each resource unit.

The AP 100 according to the present embodiment allocates the plurality of STAs 200 to one resource unit. More specifically, the AP 100 can generate a data packet in which data addressed to the plurality of STAs 200 are mixed with each other, respectively, in one resource unit, and transmit the data packet to the STA 200. At that time, the AP 100 stores information (also referred to as "allocation information") for allocating the plurality of STAs 200 to one resource unit in a preamble part of the data packet. Therefore, the STA 200 can recognize the resource unit to which an own device is allocated by analyzing the preamble part in a case of receiving the data packet, and can thus appropriately perform reception processing of the data packet.

The number of resource units allocated to the STA 200 by the AP 100 is not particularly limited, and one or more resource units may be allocated to one STA 200. In a case where the AP 100 allocates a plurality of resource units to one STA 200, the AP 100 may integrate a plurality of resource units consecutive in terms of frequency with each other to use the plurality of resource units as one resource unit or may use a plurality of resource units located at distant places.

The STA 200 is a wireless communication device that communicates with the AP 100. A type of STA 200 is not particularly limited. For example, the STA 200 may be a display having a display function, a memory having a storage function, a keyboard and a mouse having an input function, a speaker having a sound output function, and a smartphone having a function of executing advanced calculation processing.

By connecting the STA 200 to the AP 100, a basic service set (hereinafter referred to as "BSS") is formed. The connection means a state where a wireless link has been established, and the STA 200 completes exchange of parameters required for communication through an association process with the AP 100 to establish the wireless link. Note that at the time of exchanging the parameters, the AP 100 and the STA 200 may mutually transmit and receive information regarding whether or not to execute communication according to the present disclosure (communication performed by allocating one resource unit to the plurality of STAs 200) to and from each other. The STA 200a to the STA 200f in FIG. 1 belong to the BSS formed by the AP 100.

As described above, in a case where the STA 200 according to the present embodiment receives the data packet from the AP 100, the STA 200 analyzes the preamble part of the data packet to recognize the resource unit to which the own device is allocated, and performs reception processing (including decoding processing) of the data packet on the basis of a recognition result.

Note that an aspect of the wireless LAN system according to the present embodiment is not limited to the example described above with reference to FIG. 1. For example, the number of APs 100 or STAs 200 is not particularly limited. For example, there may be a plurality of APs 100 and only two STAs 200. In addition, some of functions of the AP 100 or the STA 200 may be realized by another external device. For example, another external device may realize generation processing of the data packet transmitted by the AP 100. An aspect of the wireless LAN system according to the present embodiment can be flexibly modified according to specifications and operations.

Here, the AP 100 basically has a function similar to that of the STA 200 except that it has a relay function or the like, and it can thus be said that the AP 100 is also a form of the STA 200. In addition, it is assumed that the wireless communication device according to the present disclosure is the AP 100 itself or the STA 200 itself, but the wireless communication device according to the present disclosure is not limited thereto, and may be a component (for example, an integrated circuit (IC) chip or the like) provided in the AP 100 or the STA 200.

Hereinafter, details of communication processing of the data packet by the AP 100 and the STA 200 will be described. More specifically, details of a method of allocating a plurality of STAs 200 to one resource unit, a communication method of an acknowledgment, and the like, will be described. Note that a "packet" described in the present specification may be appropriately replaced with a "frame".

1.2. Device Configuration Example

The configuration example of the wireless LAN system according to the present embodiment has been described hereinabove. Next, a configuration example of each device according to the present embodiment will be described with reference to FIG. 2. Hereinafter, a device configuration example of the AP 100 will be mainly described, but since the AP 100 and the STA 200 can basically have similar functions, each configuration example described below may be treated as a device configuration example of the STA 200.

Figure 2:
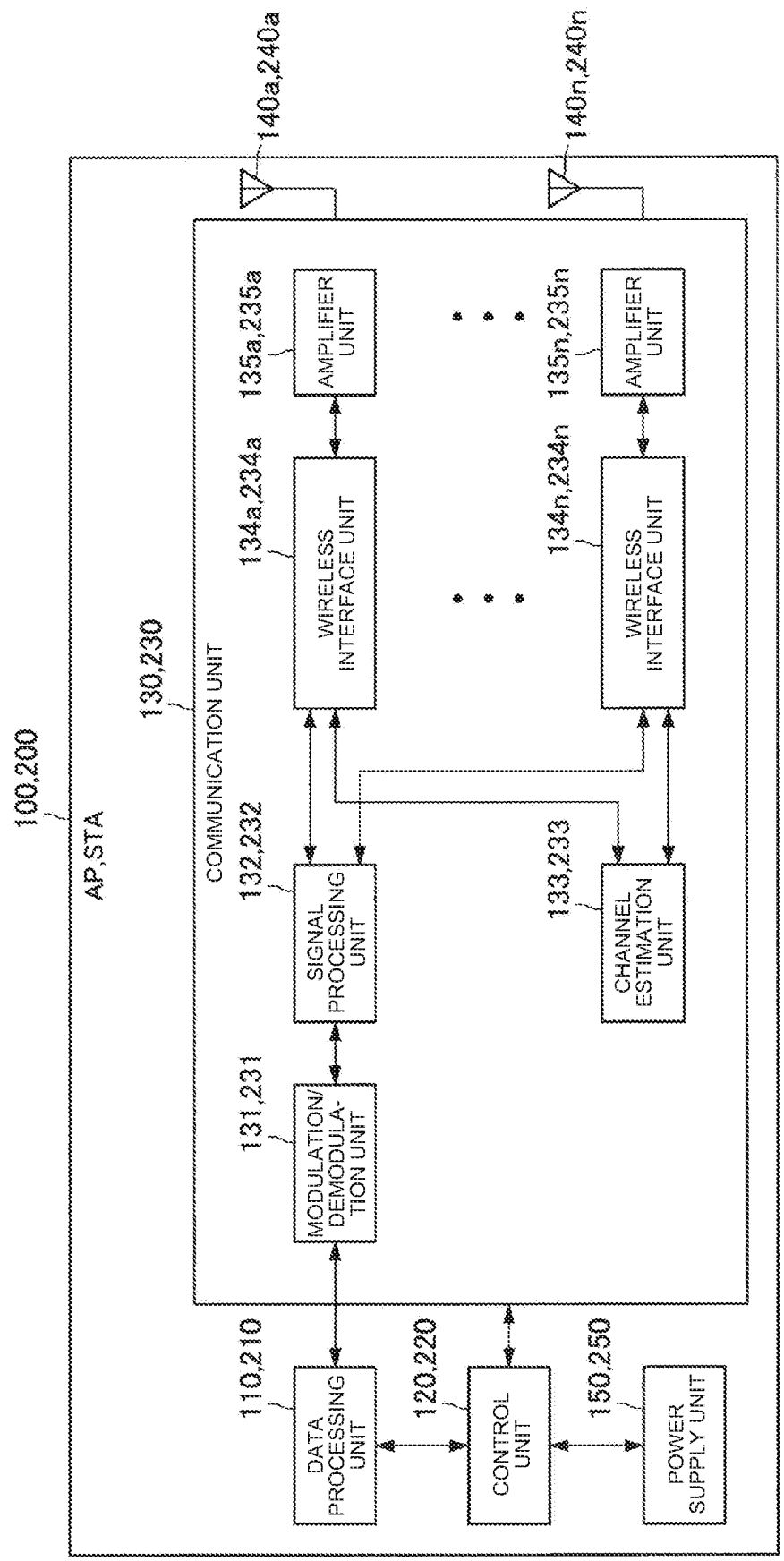
FIG. 2 is a block diagram illustrating a device configuration example of an access point (AP) 100 and a station (STA) 200 according to the present disclosure.

As illustrated in FIG. 2, the AP 100 includes a data processing unit 110, a control unit 120, a communication unit 130, an antenna 140, and a power supply unit 150. Among them, the data processing unit 110, the control unit 120, and the communication unit 130 function as a generation unit that generates a data packet by performing processing in cooperation with each other, and the communication unit 130 functions as a transmission unit that transmits the generated data packet to the STA 200. Note that a communication unit 230 included in the STA 200 functions as a reception unit that receives a data packet from the AP 100, and a data processing unit 210, a control unit 220, and a communication unit 230 included in the STA 200 function as a reception processing unit that performs reception processing (including decoding processing) of the data packet by performing processing in cooperation with each other.

(Data Processing Unit 110)

At the time of signal transmission, the data processing unit 110 generates a packet for transmission using transmission target data input from an upper layer, generates transmission data by adding a media access control (MAC) header for MAC, an error detection code, and the like, to the packet, and provides the transmission data to a modulation/demodulation unit 131. At the time of signal reception, the data processing unit 110 performs processing such as analysis of a MAC header, error detection, and the like, of reception data provided from the modulation/demodulation unit 131.

(Control Unit 120)

The control unit 120 comprehensively controls each component in the AP 100. More specifically, the control unit 120 performs setting of parameters (for example, a coding scheme, a modulation scheme, transmission power, and the like) used for processing of each component in the AP 100, scheduling of the processing, and the like. In addition, in the present embodiment, the control unit 120 performs processing for allocating a resource unit to each STA 200. For example, the control unit 120 may allocate a resource unit having a higher communication success rate to each STA 200 on the basis of a scan result of a communication environment, the past communication history, or the like. Note that a method of allocating the resource unit is not limited thereto.

In addition, the control unit 120 performs a predetermined operation on the basis of the acknowledgment from the STA 200. For example, in a case where it is proven by the acknowledgment that the data packet has not been appropriately received by the STA 200, the control unit 120 performs retransmission control or the like of the data packet. Note that the control unit 220 included in the STA 200 controls generation processing of the acknowledgment on the basis of a reception processing result of the data packet from the AP 100. Note that processing of the control unit 120 of the AP 100 and the control unit 220 of the STA 200 is not limited thereto.

(Communication Unit 130)

The communication unit 130 realizes processing regarding communication of the AP 100. As illustrated in FIG. 2, the communication unit 130 includes the modulation/demodulation unit 131, a signal processing unit 132, a channel estimation unit 133, a wireless interface unit 134, and an amplifier unit 135. Here, the wireless interface unit 134, the amplifier unit 135, and the antenna 140 may be treated as one set, and one or more sets may be provided (in FIG. 2, an example in which n sets of wireless interface units 134, amplifier units 135, the antennas 140 are provided is illustrated). Note that the antenna 140 is provided outside the communication unit 130 in FIG. 2, but the antenna 140 is not limited thereto, and may be built in the communication unit 130.

(Modulation/Demodulation Unit 131)

At the time of signal transmission, the modulation/demodulation unit 131 generates a data symbol stream by performing encoding, interleaving, and modulation on the transmission data provided from the data processing unit 110 on the basis of a coding scheme and a modulation scheme set by the control unit 120, and provides the data symbol stream to the signal processing unit 132. In addition, at the time of signal reception, the modulation/demodulation unit 131 acquires reception data by performing demodulation, deinterleaving, and decoding on a data symbol stream provided from the signal processing unit 132, and provides the reception data to the data processing unit 110.

(Signal Processing Unit 132)

At the time of signal transmission, the signal processing unit 132 performs spatial processing on the data symbol stream input from the modulation/demodulation unit 131 and provides one or more obtained transmission symbol streams to each wireless interface unit 134. At the time of signal reception, the signal processing unit 132 acquires a data symbol stream independent for each reception symbol stream by performing spatial processing on reception symbol streams provided from the wireless interface unit 134, and provides the data symbol stream to the modulation/demodulation unit 131.

(Channel Estimation Unit 133)

The channel estimation unit 133 calculates complex channel gain information of a propagation path from a preamble part and a training signal part of a reception signal provided from each wireless interface unit 134. The calculated complex channel gain information is used for the demodulation processing in the modulation/demodulation unit 131 and the spatial processing in the signal processing unit 132.

(Wireless Interface Unit 134)

At the time of signal transmission, the wireless interface unit 134 converts the input from the signal processing unit 132 into an analog signal, performs filtering and up-conversion to a carrier frequency band on the analog signal, and sends a resultant signal to the amplifier unit 135. At the time of signal reception, the wireless interface unit 134 acquires a baseband signal by performing down-conversion on a reception signal, which is an analog signal provided from the amplifier unit 135, generates a reception symbol stream by performing various processing such as filtering, conversion into a digital signal, and the like, on the baseband signal, and outputs the reception symbol stream to a signal processing unit 132 to described later. In addition, (Amplifier Unit 135)

The amplifier unit 135 performs amplification processing of a signal. More specifically, at the time of signal transmission, the amplifier unit 135 amplifies a transmission signal input from the wireless interface unit 134 up to predetermined power and sends the amplified transmission signal to the antenna 140. At the time of signal reception, the amplifier unit 135 amplifies the reception signal input from the antenna 140 up to a predetermined power and outputs the amplified reception signal to a wireless interface unit 134 to be described later. Note that these functions may also be realized by the wireless interface unit 134.

(Antenna 140)

The antenna 140 is a component that radiates (transmits) high-frequency energy as a radio wave (an electromagnetic wave) to a space or, conversely, converts (receives) a radio wave of the space into high-frequency energy. The antenna 140 may be a chip antenna, an antenna formed by a wiring on a printed circuit board, or an antenna formed using a linear conductor element.

(Power Supply Unit 150)

The power supply unit 150 is a component that supplies power to the AP 100, and may be a battery power supply or a fixed power supply.

The functional configuration example of the AP 100 and the STA 200 has been described hereinabove. Note that the functional configuration described above with reference to FIG. 2 is mere an example, and the functional configuration of the AP 100 and the STA 200 is not limited to such an example. In addition, the functional configuration of the AP 100 and the STA 200 can be flexibly modified according to specifications or operations.

1.3. Format Example

The device configuration examples of the AP 100 and the STA 200 according to the present embodiment have been described hereinabove. Next, in downlink communication using OFDMA, a format example of a data packet transmitted to each STA 200 by the AP 100 will be described.

Figure 3:
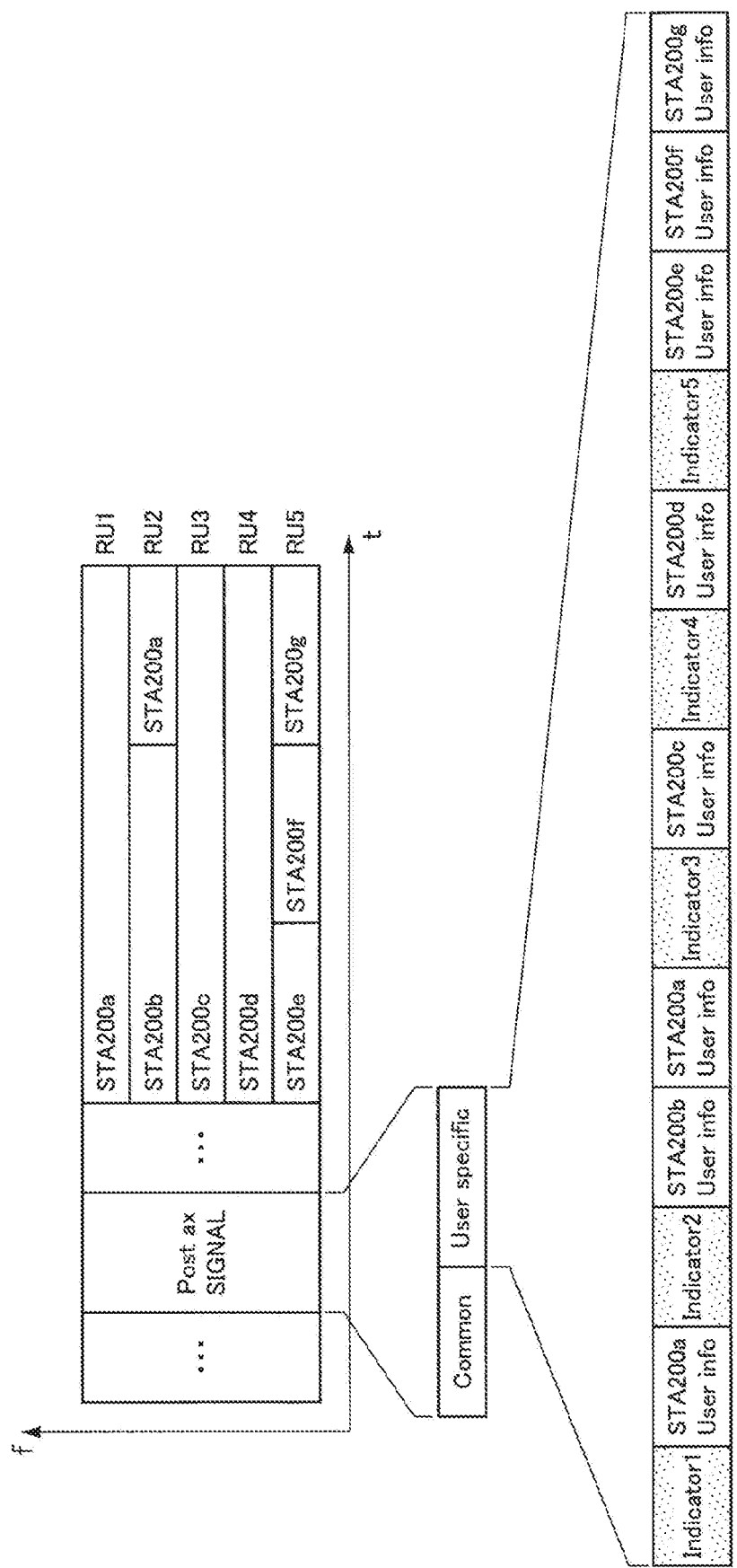
FIG. 3 is a diagram illustrating a format example of a data packet according to a first embodiment.

First, an example of a format of a data packet will be described with reference to FIG. 3. As described above, the AP 100 stores information (allocation information) for allocating the plurality of STAs 200 to one resource unit in a preamble part of the data packet. In the example of FIG. 3, the AP 100 stores information regarding allocation of resource units for each STA 200 in a portion corresponding to a User specific field in HE-SIG-B of a high efficiency multi-user presentation protocol data unit (HE MU PPDU) in the IEEE 802.11ax standard.

More specifically, the AP 100 provides an Indicator field and a User info field in the User specific field. Then, the AP 100 describes the number of STAs 200 to which a resource unit corresponding to each Indicator is allocated, in the Indicator field. For example, in FIG. 3, "2" is described in the Indicator field of Indicator2 corresponding to resource unit 2 (indicated as "RU2" in FIG. 3) to which two STAs 200 (STA 200a and STA 200b) are allocated.

Then, a User info field regarding the STA 200 to which the resource unit corresponding to each Indicator is allocated is connected to a rear stage of each Indicator field. In a case where the plurality of STAs 200 are allocated to one resource unit, User info fields for each STA 200 are connected in the order of allocation. Then, the AP 100 describes an ID of the STA 200, information indicating a combination of a modulation and coding scheme (MCS), a modulation scheme, a coding rate, and the like, in data transmission to STA 200, data length, and the like, in each User info field. Therefore, the STA 200 that has received the data packet can recognize the resource unit, the MCS, the data length, and the like, used for transmitting data to the own device by analyzing the preamble part. In addition, in a case where the plurality of STAs 200 are allocated to one resource unit, the STA 200 can recognize a position of data addressed to the own device in one resource unit.

Note that the format of the data packet is not limited to the example of FIG. 3. For example, the information stored in the Indicator field or the User info field is not limited to the example described above. More specifically, the Indicator field or the User info field can include any information as long as it is information used for reception processing (including decoding processing) of the data packet (of course, information other than the information used for the reception processing may be included in the Indicator field or the User info field). In addition, the Indicator field or the User info field can be provided in any portion of data conforming to any standard as long as it is a portion corresponding to the User specific field in the HE-SIG-B of the HE MU PPDU in the IEEE 802.11ax standard.

In the example of FIG. 3, in a case where there is a STA 200 allocated to a plurality of resource units, User info fields in which information regarding the STA 200 is stored are stored in a preamble part by the number of resource units to which the STA 200 is allocated. For example, User info fields in which information regarding the STA 200a allocated to resource unit 1 and resource unit 2 is stored are connected to rear stages of each Indicator field of Indicator1 and Indicator2. Therefore, data such as an ID of the STA 200a, an MCS, and the like, are redundantly stored, and a data length of the preamble part becomes thus long.

Figure 4:
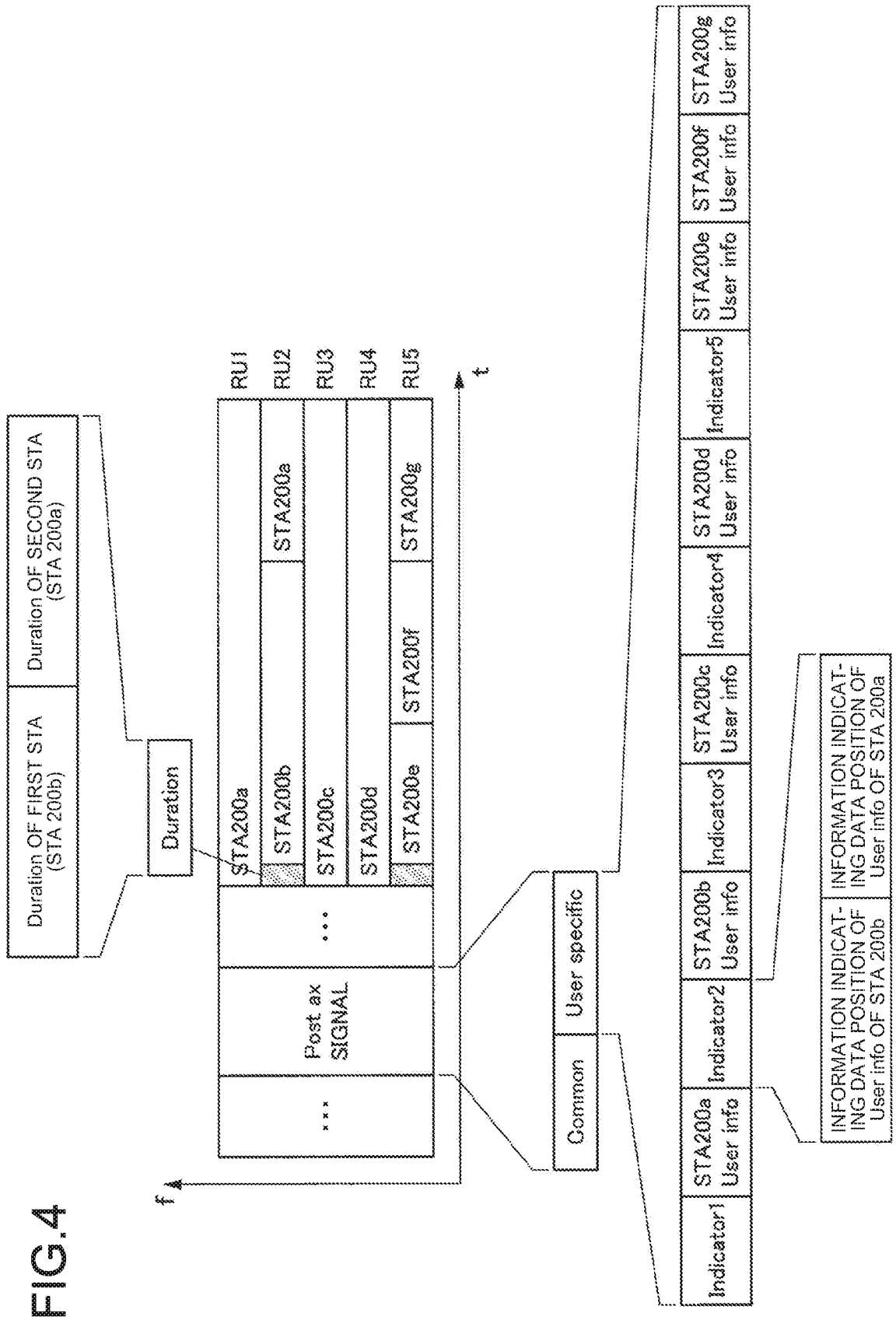
FIG. 4 is a diagram illustrating a format example of a data packet according to the first embodiment.

Therefore, the AP 100 may integrate the User info fields in which information regarding the same STA 200 is stored with each other in order to further shorten the data length of the preamble part. In FIG. 4, a format example of a data packet in a case where the AP 100 integrates the User info fields in which the information regarding the same STA 200 is stored with each other is illustrated.

More specifically, in a case where there is a STA 200 allocated to the plurality of resource units, the AP 100 can realize integration of the User info fields by storing information indicating data positions of the User info fields in which the information regarding the STA 200 is stored in an Indicator field. For example, as illustrated in FIG. 4, the AP 100 provides one User info field in which the information regarding the STA 200, which is a transmission target, is stored, for each STA 200. Then, even in a case where there is a STA 200 allocated to the plurality of resource units, the AP 100 does not newly connect the User info fields, but stores the information indicating the data positions of the User info fields in which the information regarding the STA 200 is stored, in the Indicator field.

In FIG. 4, the STA 200a is allocated to resource unit 1 and resource unit 2. Therefore, with respect to the STA 200a, the AP 100 provides the User info field of the STA 200a to a rear stage of an Indicator field of Indicator1 corresponding to resource unit 1, and stores the information indicating the data position of the User info field of the STA 200a in an Indicator field of Indicator2 corresponding to resource unit 2. Here, the information indicating the data position of the User info field of the STA 200a may be, for example, the order ("1" in the example of FIG. 4) of the User info field in which information regarding the STA 200a is stored (or an Indicator field to which the User info field is connected), from a head of the data packet, but is not limited thereto. Therefore, the AP 100 can shorten the data length of the preamble part while enabling the STA 200 to appropriately receive the data packet.

Note that in the example of FIG. 4, information such as an ID of the STA 200 allocated to the plurality of resource units, an MCS, and the like, is basically common to each resource unit, and the AP 100 can thus store such information in one User info field. On the other hand, since a data length often differs depending on each resource unit in many cases, there is a case where the AP 100 cannot store data length information in one User info field.

Therefore, as illustrated in FIG. 4, for resource units to which the plurality of STAs 200 are allocated, the AP 100 may provide a field (hereinafter, referred to as a "Duration field" for convenience) in which data length information (Duration information) of data addressed to each STA 200 is stored, between a preamble part and a data part. In the example of FIG. 4, the Duration field is provided in resource unit 2 and resource unit 5.

In the Duration field, for example, data length information can be stored in the order of data stored in the resource unit. In resource unit 2 of FIG. 4, data is transmitted in the order of the STA 200b and the STA 200a, and respective information is thus stored in the order of data length information of data addressed to the STA 200b and data length information of data addressed to the STA 200a in the Duration field. Therefore, the STA 200a and the STA 200b that have received the data packet can appropriately recognize data positions at which data addressed to the own devices are stored and data lengths of the data.

Figure 5:
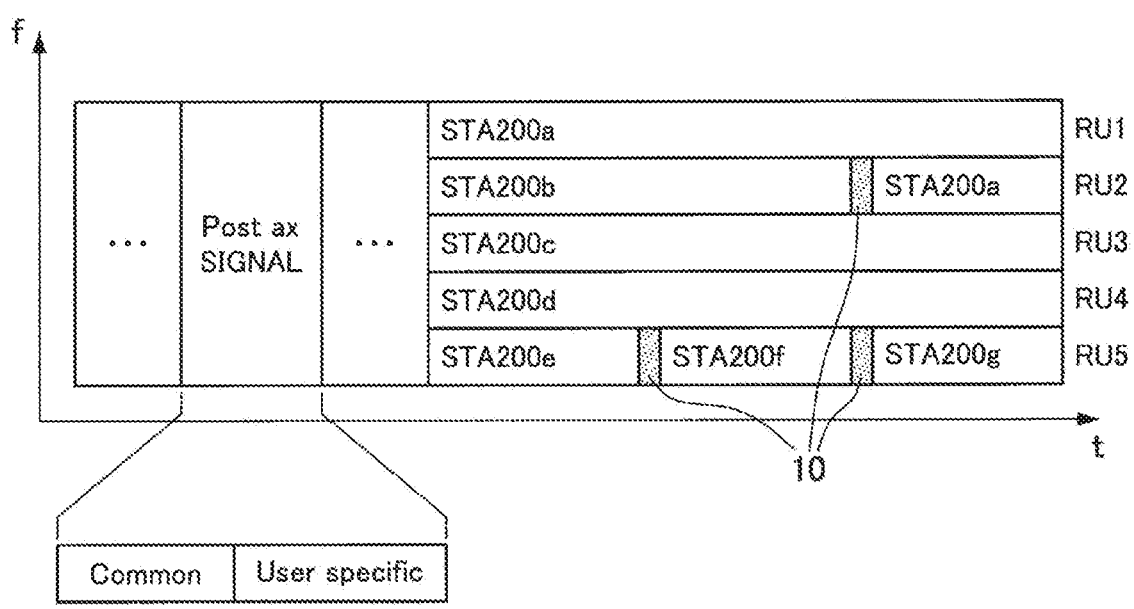
FIG. 5 is a diagram illustrating a format example of a data packet according to the first embodiment.

In addition, the AP 100 may not include the data length information in the data packet. For example, as illustrated in FIG. 5, in a case where a plurality of STAs 200 are allocated to one resource unit, the AP 100 may insert a midamble 10 into a boundary between data having different destinations in a data part in the resource unit. Here, the midamble 10 is a predetermined signal pattern, and the STA 200 recognizes the predetermined signal pattern in advance. Then, the STA 200 can detect the midamble 10 by decoding the data part in the received data packet and then extracting a correlation between a decoded signal and the predetermined signal pattern. Therefore, even though the AP 100 does not include the data length information in the data packet, the STA 200 can appropriately recognize the boundary between the data having the different destinations, and thus, can appropriately acquire the data addressed to the own device.

Note that FIGS. 3 to 5 are merely examples, and the formats of the data packet are not limited thereto. For example, information regarding allocation of the resource units to each STA 200 may be stored in any part of the preamble part of the data packet. In addition, in FIG. 4, the Duration field may be provided in a part other than a part between the preamble part and the data part.

1.4. Flow of Processing

The format example of the data packet transmitted to each STA 200 by the AP 100 has been described hereinabove. Next, examples of flows of processing by the AP 100 and the STA 200 will be described.

(Flow of Processing by AP 100)

Figure 6:
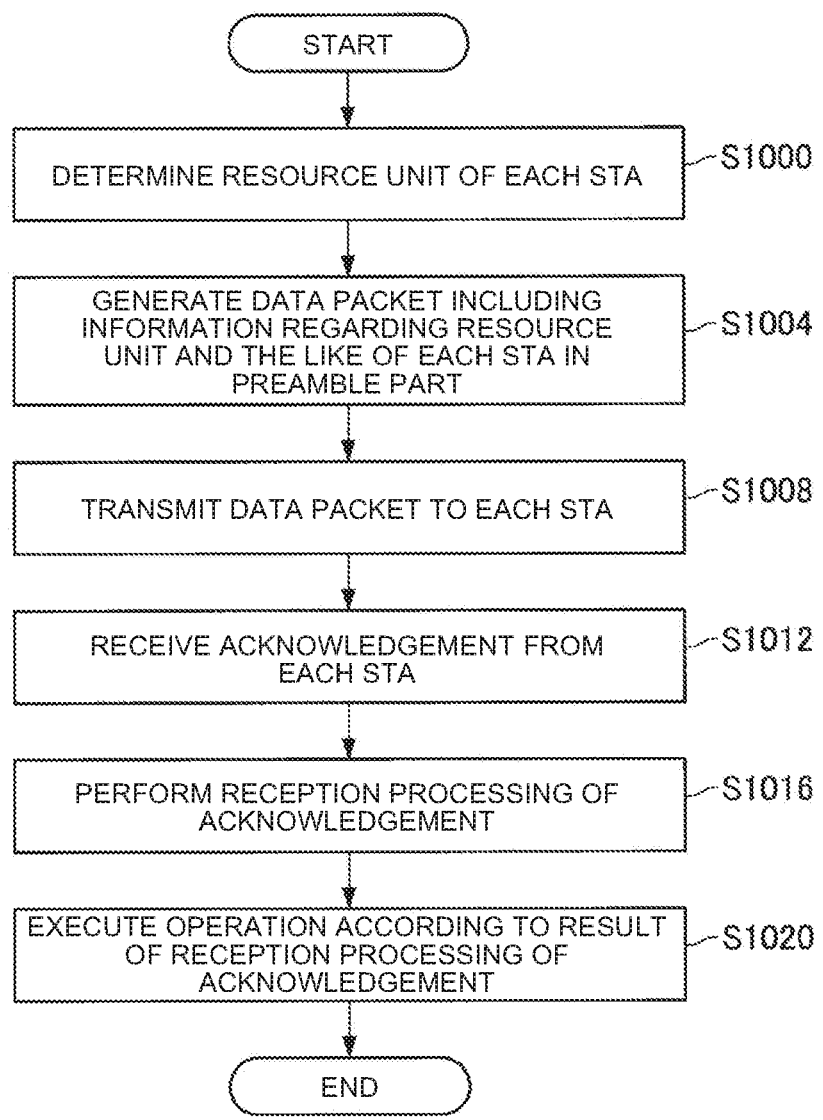
FIG. 6 is a flowchart illustrating an example of a flow of processing by the AP 100 according to the first embodiment.

First, an example of a flow of processing by the AP 100 will be described with reference to FIG. 6. FIG. 6 is a flowchart illustrating an example of processing when the AP 100 transmits a data packet to the STA 200 and receives an acknowledgment from the STA 200.

In step S1000, the control unit 120 of the AP 100 selects one or two or more STAs 200 which are transmission targets of a data packet, and determines a resource unit of each STA 200. In addition, the control unit 120 determines a parameter such as an MCS, a data length, or the like, if necessary. Thereafter, the data processing unit 110 and the communication unit 130 generate a data packet including information regarding the resource unit and the like of each STA 200 in a preamble part in step S1004, and transmit the data packet to each STA 200 in step S1008.

After the data packet is received by each STA 200, the communication unit 130 and the data processing unit 110 of the AP 100 receive an acknowledgment from each STA 200 in step S1012, and perform reception processing (including decoding processing) of the acknowledgment in step S1016. In step S1020, the control unit 120 executes an operation according to a result of the reception processing of the acknowledgment, such that a series of processing ends. For example, in a case where it is proven by the acknowledgment that the data packet has not been appropriately received by the STA 200, the control unit 120 performs retransmission control or the like of the data packet. Note that the operation according to the result of the reception processing of the acknowledgment is not limited thereto.

(Flow of Processing by STA 200)

Figure 7:
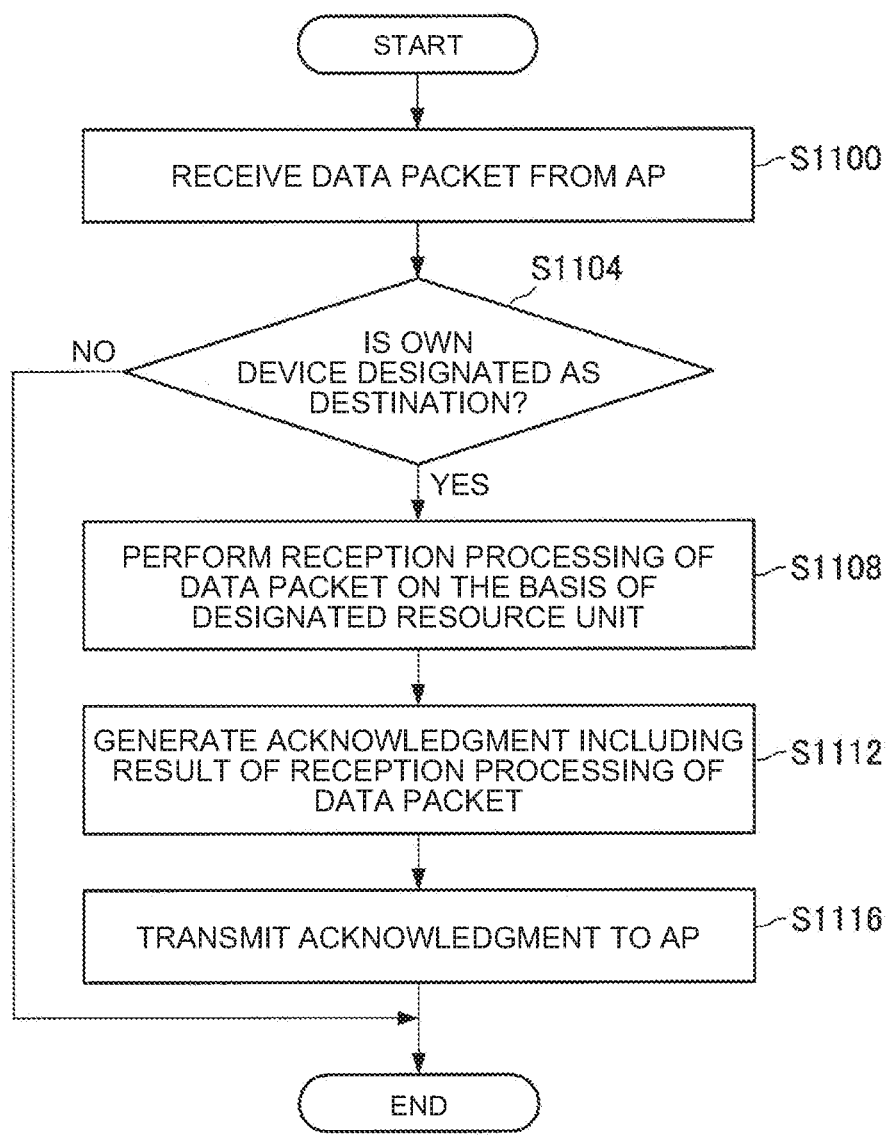
FIG. 7 is a flowchart illustrating an example of a flow of processing by the STA 200 according to the first embodiment.

Next, an example of a flow of processing by the STA 200 will be described with reference to FIG. 7. FIG. 7 is a flowchart illustrating an example of processing when the STA 200 receives a data packet from the AP 100 and transmits an acknowledgment to the AP 100.

The communication unit 230 and the data processing unit 210 of the STA 200 receive the data packet from the AP 100 in step S1100, and confirm whether or not the own device is designated as a destination on the basis of the preamble part or the like of the data packet in step S1104. In a case where the own device is designated as the destination of the data packet (step S1104: Yes), the communication unit 230 and the data processing unit 210 perform reception processing (including decoding processing) of the data packet on the basis of the resource unit or the like designated in the preamble part, in step S1108. Then, the communication unit 230 and the data processing unit 210 generate an acknowledgment including a result of the reception processing of the data packet in step S1112, and transmit the acknowledgment to the AP 100 in step S1116, such that a series of processing ends. Note that in a case where the own device is not designated as the destination of the data packet (step S1104: No) in step S1104, a series of processing ends without performing the reception processing of the data packet, and the like.

Here, a transmission example of the acknowledgment performed in step S1116 of FIG. 7 is illustrated. As illustrated in step S1200 of FIG. 8, it is assumed that resource unit 2 and resource unit 5 in a data packet transmitted to each STA 200 by the AP 100 are allocated to a plurality of STAs 200. More specifically, it is assumed that resource unit 2 is allocated to the STA 200a and the STA 200b and resource unit 5 is allocated to the STA 200e, the STA 200f, and the STA 200g. Then, it is assumed that the other resource units are allocated to only one STA 200. More specifically, it is assumed that resource unit 1 is allocated only to the STA 200a, resource unit 3 is allocated only to the STA 200c, and resource unit 4 is allocated only to the STA 200d.

Figure 8:
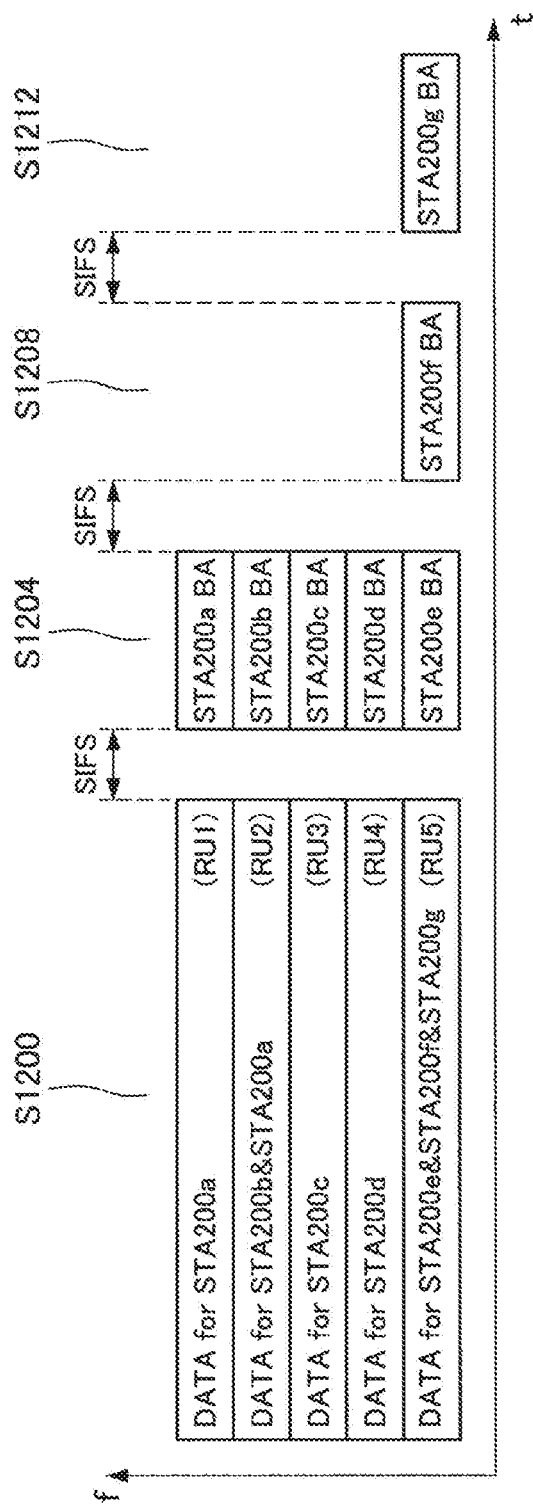
FIG. 8 is a diagram illustrating a transmission example of an acknowledgment transmitted from the STA 200 to the AP 100 in the first embodiment.

Then, the STA 200 singly allocated to only one resource unit among the respective STAs 200 transmits an acknowledgment ("Block Ack (BA)" in the example of FIG. 8) to the AP 100 using the one resource unit. In the example of FIG. 8, in step S1204, the STA 200c transmits the acknowledgment to the AP 100 using resource unit 3, and the STA 200d transmits the acknowledgment to the AP 100 using resource unit 4. Note that it is assumed that each STA 200 transmits the acknowledgment after a predetermined period (a short inter frame space (SIFS) in the example of FIG. 8) has elapsed since each STA 200 has received the data packet.

In addition, the STA 200 having both of the resource unit singly allocated and the resource unit allocated so as to be shared with another STA 200 transmits the acknowledgment to the AP 100 using the resource unit singly allocated. In the example of FIG. 8, in step S1204, the STA 200a transmits the acknowledgment to the AP 100 using resource unit 1. Furthermore, the STA 200 having only one resource unit allocated to be shared with another STA 200 transmits the acknowledgment to the AP 100 using the shared resource unit. In the example of FIG. 8, in step S1204, the STA 200b transmits the acknowledgment to the AP 100 using resource unit 2, and the STA 200e transmits the acknowledgment to the AP 100 using resource unit 5.

Note that in a case where the plurality of STAs 200 transmit the acknowledgments using one resource unit, each STA 200 transmits the acknowledgment one by one in the order in which each STA 200 has received data, at intervals of a predetermined period (SIFS in the example of FIG. 8). In the example of FIG. 8, after the STA 200e transmits the acknowledgment using resource unit 5 in step S1204, the STA 200f and the STA 200g transmit the acknowledgments one by one at intervals of the SIFS in step S1208 and in step S1212, respectively. Therefore, even in a case where one resource unit is allocated to the plurality of STAs 200, each STA 200 can appropriately transmit the acknowledgment.

Figure 9:
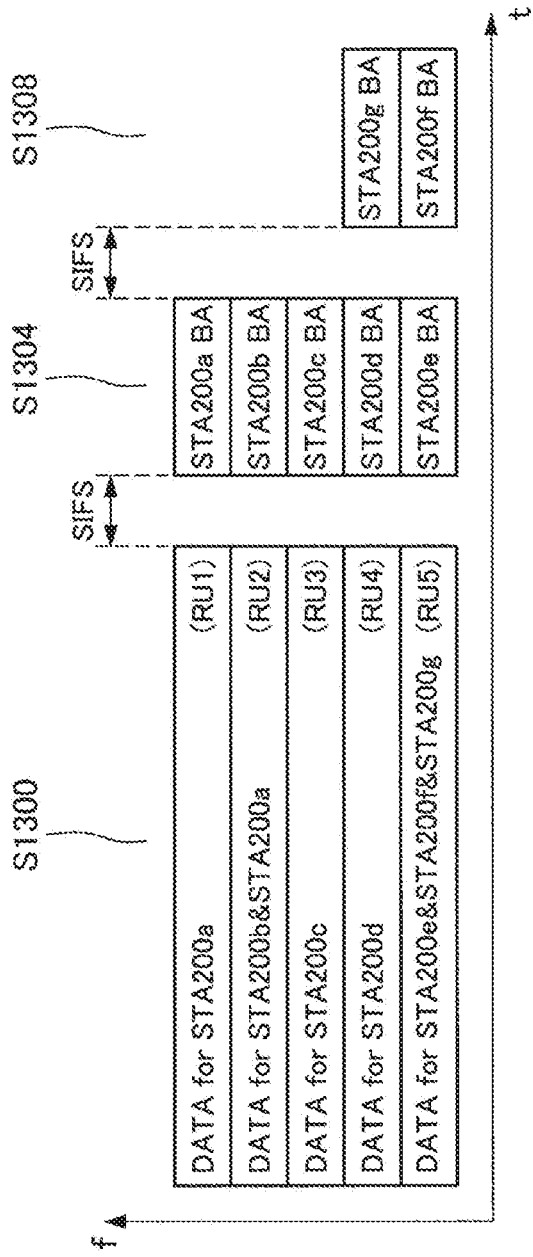
FIG. 9 is a diagram illustrating a transmission example of an acknowledgment transmitted from the STA 200 to the AP 100 in the first embodiment.

In addition, a transmission aspect of the acknowledgment is not limited to the example of FIG. 8. For example, the STA 200 may transmit the acknowledgment using a resource unit different from the resource unit in which the data is received. For example, as illustrated in FIG. 9, the STA 200g may transmit the acknowledgment using resource unit 4 instead of using resource unit 5 as in FIG. 8 in step S1308 (note that the others are similar to those of FIG. 8). Therefore, as can be seen by comparing FIGS. 8 and 9 with each other, a transmission period of all acknowledgments is shortened. Note that in this case, when the AP 100 transmits a data packet in step S1300, the AP 100 designates a resource unit and a transmission timing for transmission of an acknowledgment in the data packet (for example, User info field).

Figure 10:
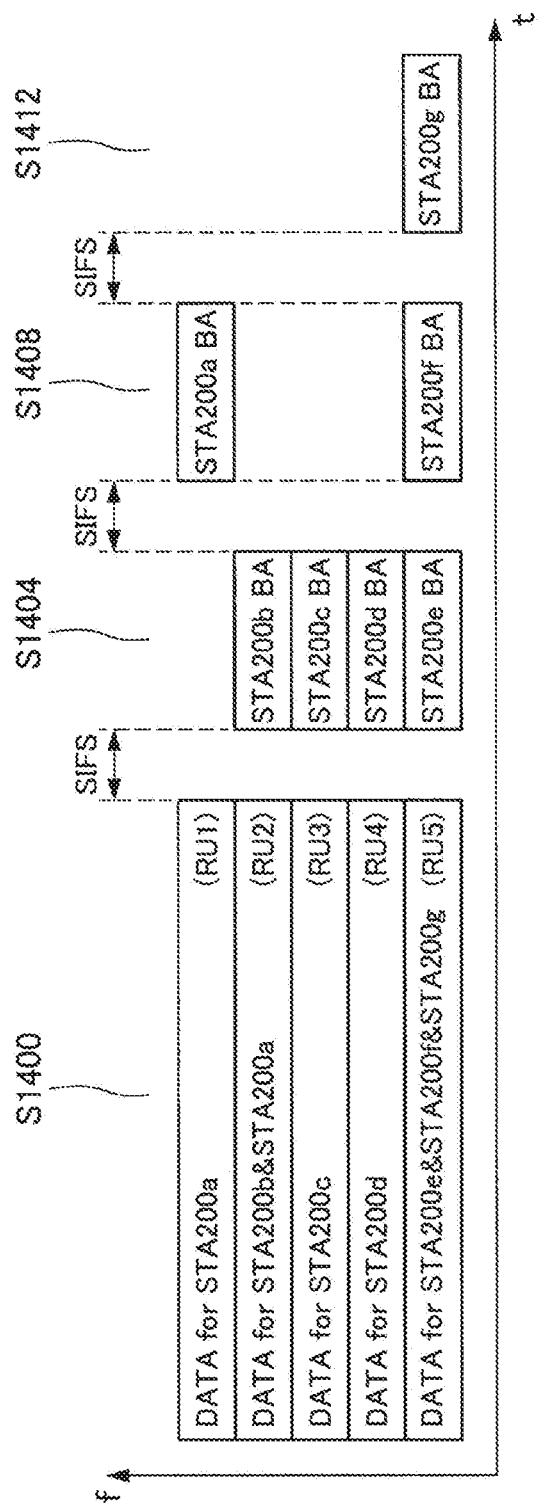
FIG. 10 is a diagram illustrating a transmission example of an acknowledgment transmitted from the STA 200 to the AP 100 in the first embodiment.

Here, in a case where the STA 200 receives data using both of the resource unit singly allocated and the resource unit allocated to be shared with another STA 200, there is a case where a delay occurs in reception processing (including decoding processing) of the data, such that the STA 200 cannot transmit the acknowledgment at a predetermined timing (for example, after the SIFS has elapsed since the STA 200 has received the data packet). In this case, the STA 200 may delay a transmission timing of the acknowledgment for a predetermined period. For example, as illustrated in FIG. 10, in step S1404, in a case where the STA 200a could not transmit the acknowledgment after the SIFS has elapsed since the STA 200a has received the data packet, the STA 200a may transmit the acknowledgment at a timing of step S1408 after the SIFS has further elapsed. Of course, a transmission aspect of the acknowledgment is not limited to the examples of FIGS. 9 and 10.

2. SECOND EMBODIMENT

The first embodiment of the present disclosure has been described hereinabove. Next, a second embodiment of the present disclosure will be described.

In the first embodiment, the example in which the downlink communication using the OFDMA is performed has been described. In a second embodiment, an example in which uplink communication using OFDMA is performed will be described.

Figure 11:
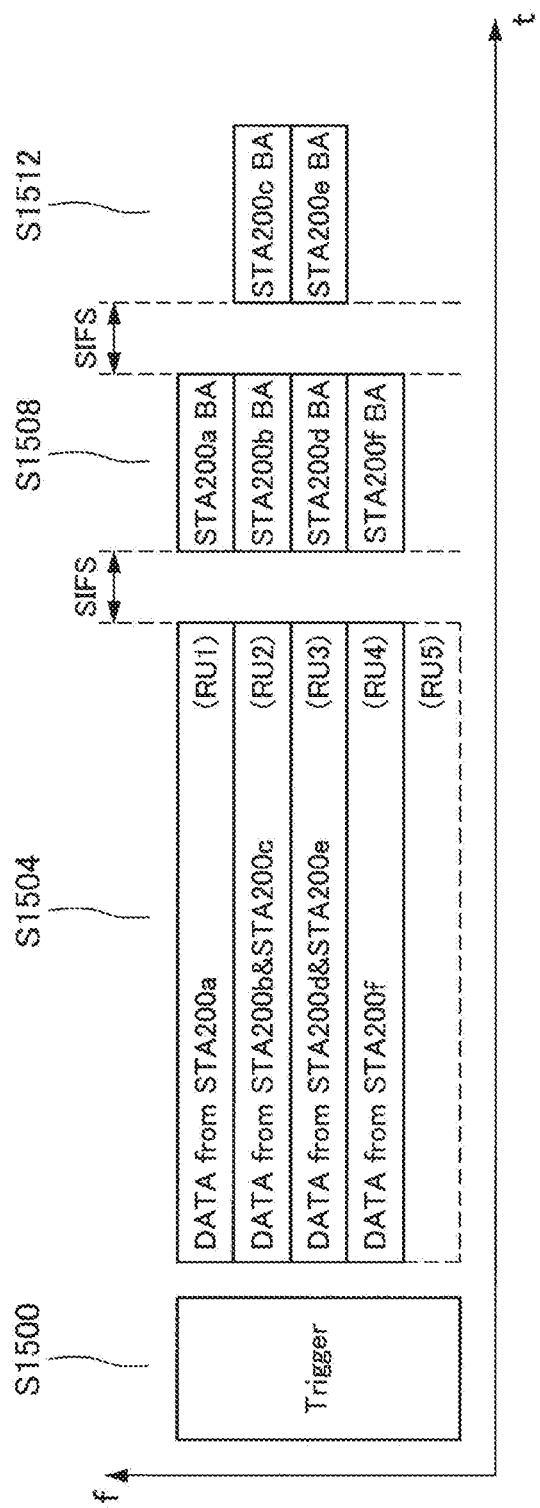
FIG. 11 is a diagram illustrating a transmission example in a case where uplink communication using an orthogonal frequency division multiple access (OFDMA) is performed in a second embodiment.

More specifically, in step S1500 of FIG. 11, an AP 100 transmits a trigger (denoted as "Trigger" in FIG. 11) that designates a transmission timing of a data packet by each STA 200 and a resource unit for transmission, to each STA 200. In step S1504, each STA 200 that has received the trigger transmits the data packet to the AP 100 using the transmission timing and the resource unit designated by the trigger. In the example of FIG. 11, it is assumed that resource unit 1 is allocated to the STA 200*a*, resource unit 2 is allocated to the STA 200*b* and the STA 200*c*, resource unit 3 is allocated to the STA 200*d* and the STA 200*e*, and resource unit 4 is allocated to the STA 200*f*.

In step S1508 and step S1512, the AP 100 that has received the data packet transmits an acknowledgment to each STA 200. Here, in a case where one resource unit is allocated to the plurality of STAs 200, the AP 100 transmits an acknowledgment to each STA 200 at intervals of an SIFS in the order in which data is received in the resource unit, as illustrated in FIG. 11.

A configuration example of a wireless LAN system according to the second embodiment is similar to the configuration example (see FIG. 1) of the wireless LAN system according to the first embodiment, and a description thereof will thus be omitted. In addition, describing a device configuration example according to the second embodiment, a data processing unit 110 of the AP 100 generates not only a data packet but also a trigger. In addition, a communication unit 130 of the AP 100 functions as a reception unit that receives a data packet in which data from a plurality of STAs 200 are mixed with each other in one resource unit, as described above. In addition, the data processing unit 110, a control unit 120, and the communication unit 130 of the AP 100 function as a reception processing unit that extracts data from at least one STA 200 of the plurality of STAs 200 from the data packet by performing processing in cooperation with each other and perform reception processing (including decoding processing) of the data packet on the basis of allocation information. In addition, a control unit 220 of the STA 200 controls transmission processing of the data packet to the AP 100 on the basis of the trigger from the AP 100.

Figure 12:
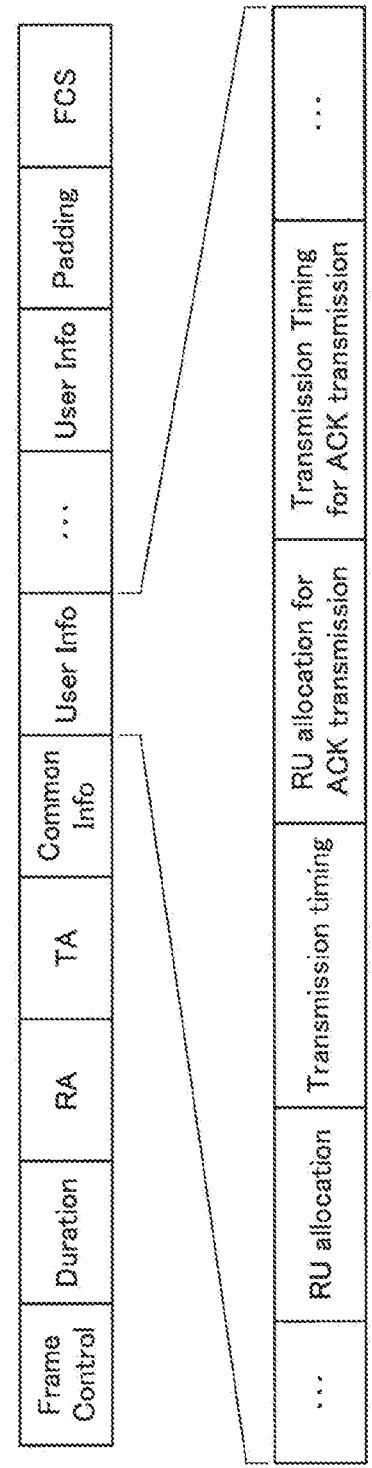
FIG. 12 is a diagram illustrating a format example of a trigger according to the second embodiment.

Here, a format example of the trigger generated by the AP 100 will be described with reference to FIG. 12. The AP 100 stores information (allocation information) for allocating the plurality of STAs 200 to one resource unit in the trigger. More specifically, as illustrated in FIG. 12, the AP 100 stores a User info field regarding each STA 200 in the trigger, and stores RU allocation, Transmission timing, RU allocation for ACK transmission, and Transmission timing for ACK transmission as the allocation information in each User info field.

The RU allocation is information regarding a resource unit used when the STA 200 transmits the data packet. For example, the AP 100 stores identification information indicating a resource unit for transmission of the data packet in the RU allocation. In addition, the Transmission timing is information regarding a transmission timing of the data packet when the STA 200 transmits the data packet. For example, the AP 100 designates the transmission timing of the data packet by a time elapsed from a reception timing of the trigger, or the like. With such information, each STA 200 can appropriately transmit the data packet.

In addition, the RU allocation for ACK transmission is information regarding a resource unit used when the AP 100 transmits the acknowledgment to the STA 200. For example, the AP 100 stores identification information indicating a resource unit for transmission of the acknowledgment in the RU allocation for ACK transmission. In addition, the Transmission timing for ACK transmission is information regarding a transmission timing of the acknowledgment when the AP 100 transmits the acknowledgment. For example, the AP 100 designates the transmission timing of the acknowledgment by a time elapsed from a reception timing of the data packet, or the like. With such information, each STA 200 can appropriately receive the acknowledgment. In addition, the format of the trigger is not limited to the example illustrated in FIG. 12. For example, in a Trigger Dependent User Info located at an end in a User info field in a trigger specified in the IEEE 802.11ax standard and having a variable length, the allocation information such as the RU allocation, the Transmission timing, the RU allocation for ACK transmission, the Transmission timing for ACK transmission, and the like, described above may be stored.

Next, examples of flows of processing by the AP 100 and the STA 200 according to the second embodiment will be described.

Figure 13:
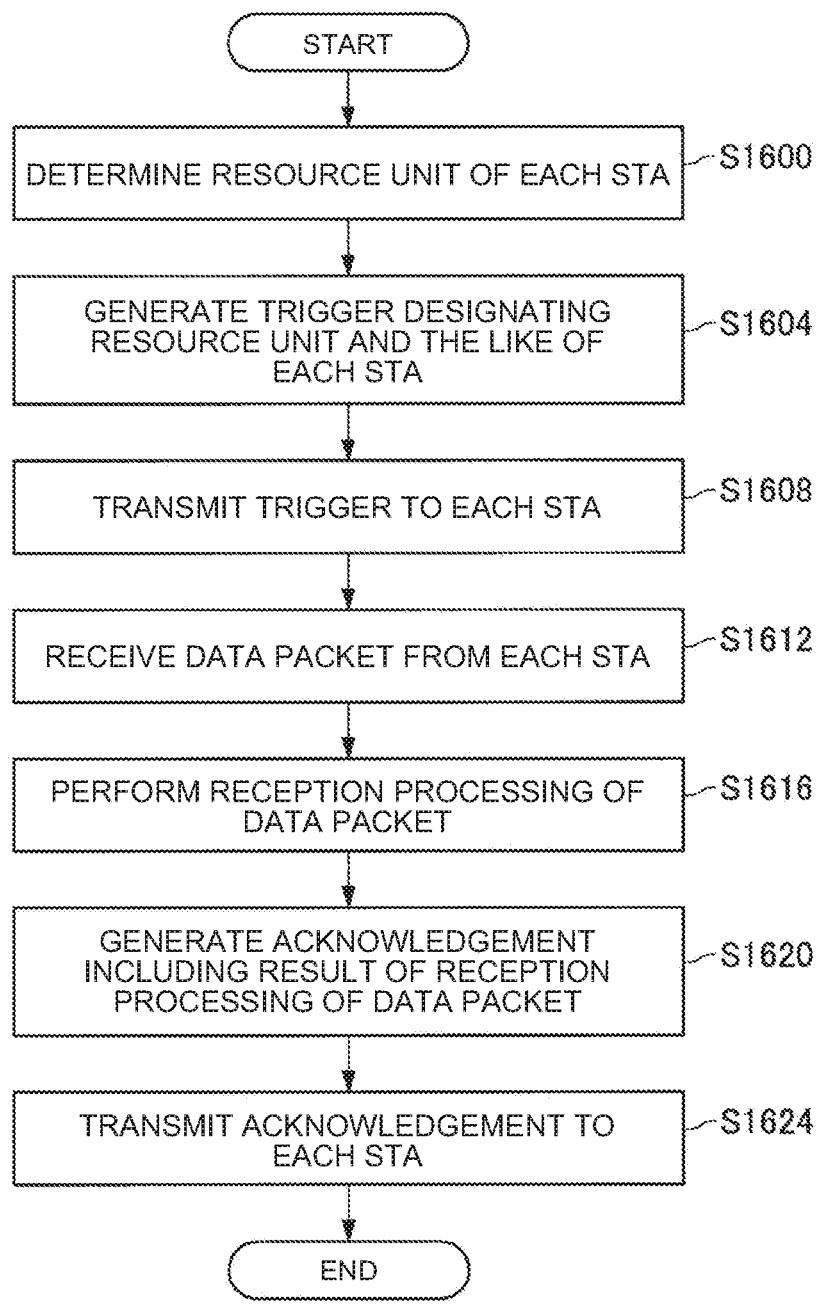
FIG. 13 is a flowchart illustrating an example of a flow of processing by the AP 100 according to the second embodiment.

First, an example of a flow of processing by the AP 100 according to the second embodiment will be described with reference to FIG. 13. FIG. 13 is a flowchart illustrating an example of a series of processing when the AP 100 performs transmission of a trigger to the STA 200, reception of a data packet from the STA 200, and transmission of an acknowledgment to the STA 200.

In step S1600, the control unit 120 of the AP 100 selects one or two or more STAs 200 which are transmission targets of a trigger, and determines a resource unit of each STA 200. Thereafter, the data processing unit 110 and the communication unit 130 generate a trigger (see FIG. 12) including information (for example, RU allocation or the like) regarding the resource unit and the like of each STA 200 in step S1604, and transmit the trigger to each STA 200 in step S1608.

After each STA 200 receives the trigger and transmits the data packet on the basis of the trigger, the communication unit 130 and the data processing unit 110 of the AP 100 receive the data packet from each STA 200 in step S1612, and perform reception processing (including decoding processing) of the data packet in step S1616. Then, the communication unit 130 and the data processing unit 110 generate an acknowledgment including a result of the reception processing of the data packet in step S1620, and transmit the acknowledgment to each STA 200 in step S1624, such that a series of processing ends.

Figure 14:
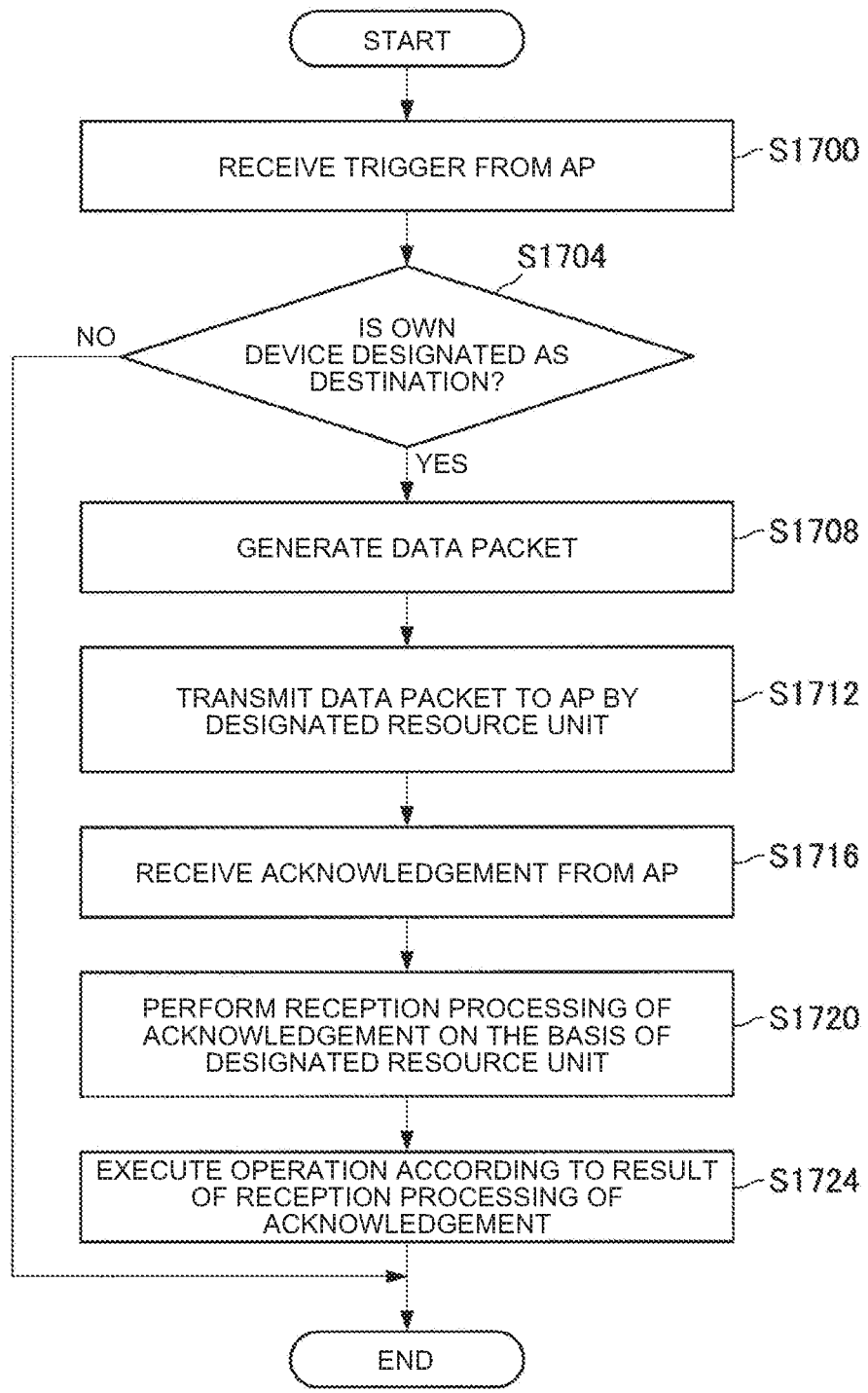
FIG. 14 is a flowchart illustrating an example of a flow of processing by the STA 200 according to the second embodiment.

Next, an example of a flow of processing by the STA 200 according to the second embodiment will be described with reference to FIG. 14. FIG. 14 is a flowchart illustrating an example of a series of processing when the STA 200 receives a trigger from the AP 100 and transmits a data packet to the AP 100 on the basis of the trigger.

The communication unit 230 and the data processing unit 210 of the STA 200 receive the trigger from the AP 100 in step S1700, and confirm whether or not the own device is designated as a destination of the trigger in step S1704. In a case where the own device is designated as the destination of the trigger (step S1704: Yes), the communication unit 230 and the data processing unit 210 generate a data packet for transmission in step S1708, and transmit the data packet to the AP 100 on the basis of the resource unit or the like designated in the trigger in step S1712.

After the data packet is received and an acknowledgment is transmitted by the AP 100, the communication unit 230 and the data processing unit 210 of the STA 200 receive the acknowledgment from the AP 100 in step S1716, and perform reception processing (including decoding processing) of the acknowledgment on the basis of the resource unit or the like designated in the trigger in step S1720. In step S1724, the control unit 220 executes an operation according to a result of the reception processing of the acknowledgment, such that a series of processing ends. For example, in a case where it is proven by the acknowledgment that the data packet has not been appropriately received by the AP 100, the control unit 220 performs retransmission control or the like of the data packet. Note that the operation according to the result of the reception processing of the acknowledgment is not limited thereto. In addition, in a case where the own device is not designated as the destination of the trigger (step S1704: No) in step S1704, a series of processing ends without performing the transmission processing of the data packet, and the like.

Figure 15:
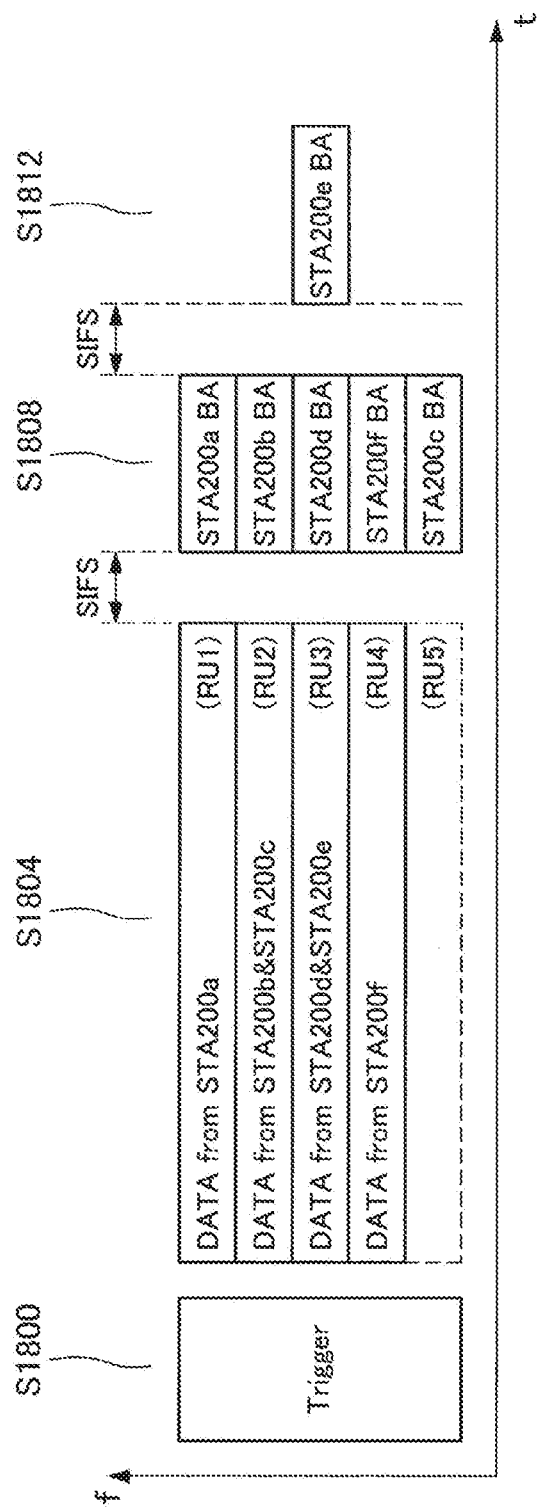
FIG. 15 is a diagram illustrating a transmission example in a case where uplink communication using an OFDMA is performed in the second embodiment.

Here, a series of transmission aspects in the second embodiment are not limited to the example described above with reference to FIG. 11. For example, in a case where there is a resource unit that is not used for transmission, the AP 100 may transmit the acknowledgment using such a resource unit. More specifically, as illustrated in FIG. 15, in a case where resource unit 5 is not used for transmission, the AP 100 may transmit the acknowledgment to the STA 200*c* that has transmitted the data packet using resource unit 2, using resource unit 5 in step S1808. Therefore, the AP 100 can more efficiently utilize communication resources. Note that in this case, the AP 100 notifies the STA 200*c* of a resource unit and a transmission timing for transmission of the acknowledgment to the STA 200*c* by a trigger (for example, User info field) transmitted in step S1800. Of course, a series of transmission aspects are not limited to the example of FIG. 15.

3. APPLICATION EXAMPLE

The technology according to the present disclosure can be applied to various products. For example, the STA 200 may be realized as a mobile terminal such as a smartphone, a tablet personal computer (PC), a notebook PC, a portable game terminal, or a digital camera, a fixed terminal such as a television receiver, a printer, a digital scanner, or a network storage, or an in-vehicle terminal such as a car navigation device. In addition, the STA 200 may be realized as a terminal (also referred to as a machine type communication (MTC) terminal) that performs machine to machine (M2M) communication, such as a smart meter, a vending machine, a remote monitoring device, or a point of sale (POS) terminal. Furthermore, the STA 200 may be a wireless communication module (for example, an integrated circuit module configured by one die) that is mounted on these terminals.

On the other hand, for example, the AP 100 may be realized as a wireless LAN access point (also referred to as a wireless base station) that has a router function or does not have a router function. In addition, the AP 100 may be realized as a mobile wireless LAN router. Furthermore, the AP 100 may be a wireless communication module (for example, an integrated circuit module configured by one die) that is mounted on these devices.

3.1. First Application Example

Figure 16:
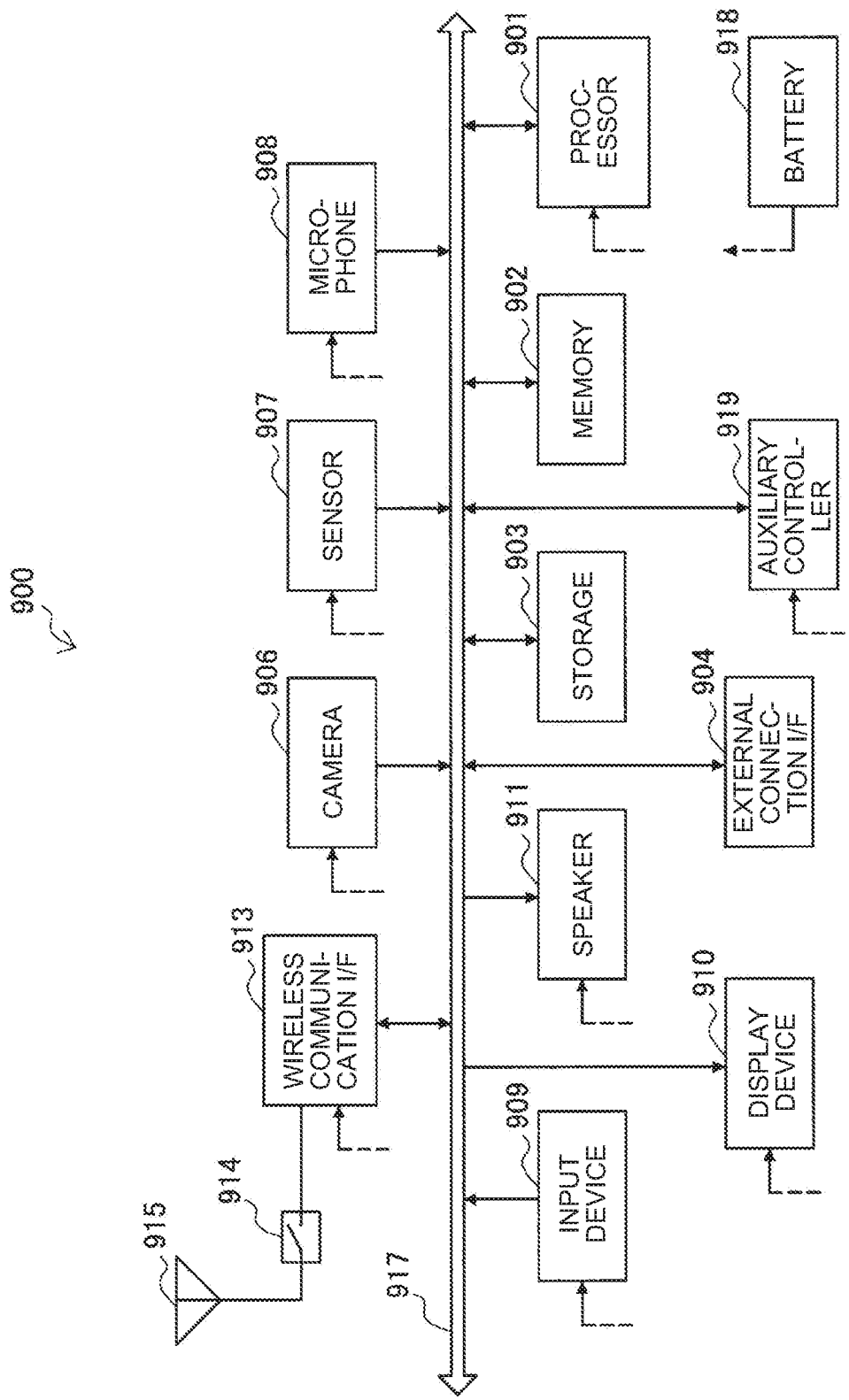
FIG. 16 is a block diagram illustrating an example of a schematic configuration of a smartphone.

FIG. 16 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores a program executed by the processor 901 and data. The storage 903 can include a storage medium such as a semiconductor memory and a hard disk. The external connection interface 904 is an interface for connecting an externally attached device such as a memory card and a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group including, for example, a positioning sensor, a gyro sensor, a geomagnetic sensor, an acceleration sensor and the like. The microphone 908 converts a sound input into the smartphone 900 to an audio signal. The input device 909 includes, for example, a touch sensor that detects a touch on a screen of the display device 910, a key pad, a keyboard, a button, a switch or the like, and accepts an operation or an information input from a user. The display device 910 includes a screen such as a liquid crystal display (LCD) and organic light emitting diode (OLED) display, and displays an output image of the smartphone 900. The speaker 911 converts an audio signal output from the smartphone 900 to a sound.

The wireless communication interface 913 supports one or more of wireless LAN standards such as IEEE 802.11a, 11b, 11g, 11n, 11ac, 11ad, and 11ax, and executes wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi Direct (registered trademark). Note that in the Wi-Fi Direct, one of the two terminals operates as an access point, unlike the ad hoc mode, but the communication is directly performed between these terminals. The wireless communication interface 913 can typically include a baseband processor, a radio frequency (RF) circuit, a power amplifier, and the like. The wireless communication interface 913 may be a one-chip module in which a memory that stores a communication control program, a processor that executes the communication control program, and related circuits are integrated. The wireless communication interface 913 may support other types of wireless communication schemes such as a short-range wireless communication scheme, a close proximity wireless communication scheme, and a cellular communication scheme, in addition to a wireless LAN scheme. The antenna switch 914 switches a connection destination of the antenna 915 among a plurality of circuits (for example, circuits for different wireless communication schemes) included in the wireless communication interface 913. Each antenna 915 has a single or a plurality of antenna elements (for example, a plurality of antenna elements forming a multiple-input multiple-output (MIMO) antenna), and is used to transmit and receive a wireless signal by the wireless communication interface 913.

Note that the smartphone 900 is not limited to the example of FIG. 16, and may include a plurality of antennas (for example, an antenna for the wireless LAN and an antenna for the close proximity wireless communication scheme). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies electric power to each block of the smartphone 900 illustrated in FIG. 16 via a feeder line that is partially illustrated as a broken line in FIG. 16. The auxiliary controller 919, for example, operates a minimally necessary function of the smartphone 900 in a sleep mode.

In the smartphone 900 illustrated in FIG. 16, the processor 901 may function as the control unit 220 of the STA 200 described with reference to FIG. 2. For example, the processor 901 generates the acknowledgment on the basis of the reception processing result of the data packet from the AP 100, and controls the transmission processing of the acknowledgment to the AP 100. At that time, the processor 901 can control the transmission processing of the acknowledgment so as to share the resource unit with another STA 200 on the basis of the information stored in the data packet from the AP 100. In addition, the processor 901 can control the transmission processing of the data packet so as to share the resource unit with another STA 200 on the basis of the trigger from the AP 100. Therefore, the processor 901 can realize more efficient communication in the wireless LAN system.

Note that the smartphone 900 may operate as a radio access point (software AP) by allowing the processor 901 to execute an access point function at an application level. In addition, the wireless communication interface 913 may have the radio access point function.

3.2. Second Application Example

Figure 17:
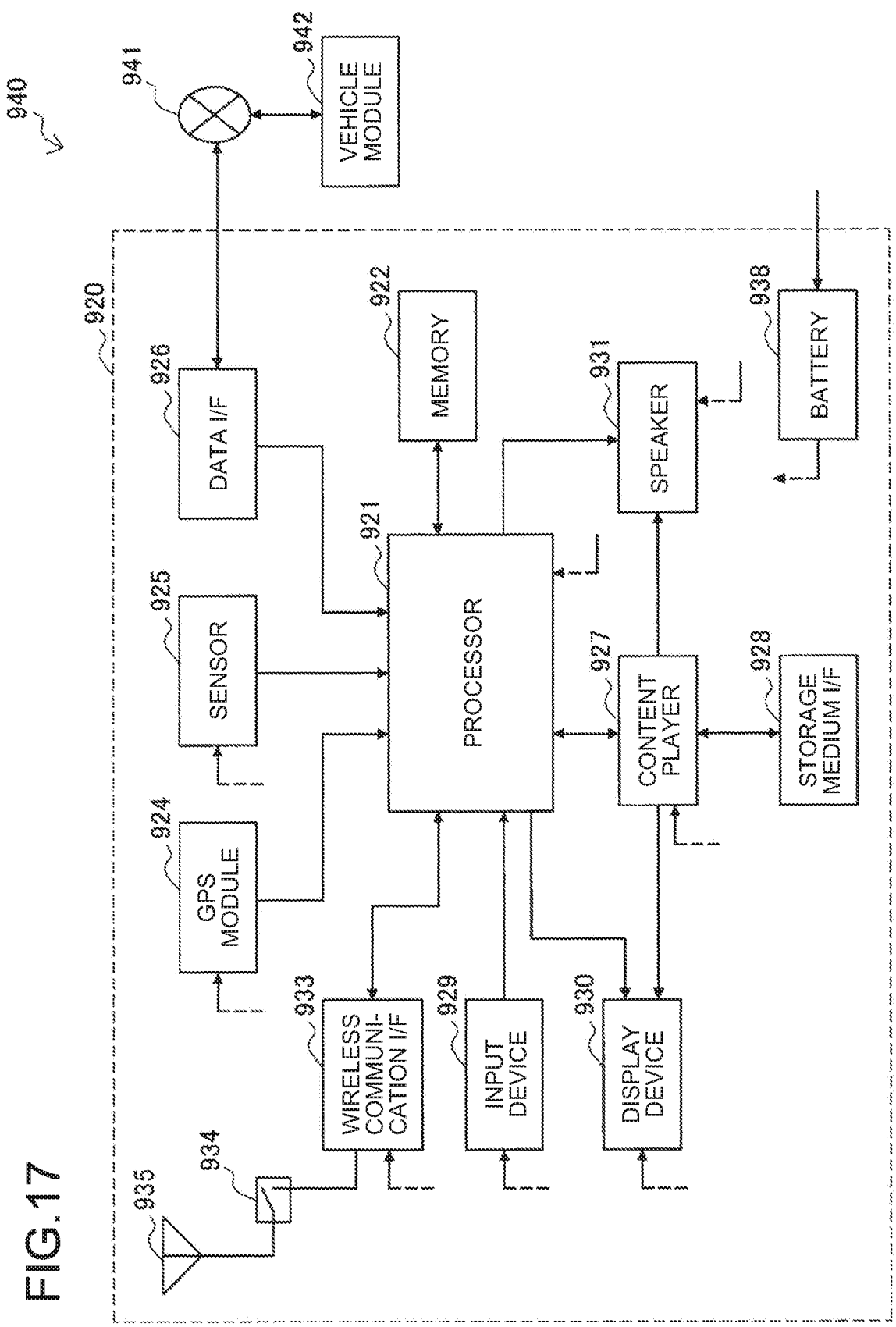
FIG. 17 is a block diagram illustrating an example of a schematic configuration of a car navigation device.

FIG. 17 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls a navigation function and the other functions of the car navigation device 920. The memory 922 includes a RAM and a ROM, and stores a program executed by the processor 921 and data.

The GPS module 924 measures the position (e.g., latitude, longitude, and altitude) of the car navigation device 920 using a GPS signal received from a GPS satellite. The sensor 925 can include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on a vehicle side.

The content player 927 reproduces content stored in a storage medium (e.g., a compact disk (CD) or a digital versatile disk (DVD)) inserted into the storage medium interface 928. The input device 929 includes, for example, a touch sensor that detects a touch on a screen of the display device 930, a button, a switch or the like, and accepts an operation or an information input from a user. The display device 930 includes a screen such as an LCD or OLED display, and displays an image of a navigation function or the reproduced content. The speaker 931 outputs a sound of the navigation function or the reproduced content.

The wireless communication interface 933 supports one or more of wireless LAN standards such as IEEE 802.11a, 11b, 11g, 11n, 11ac, 11ad, and 11ax, and executes wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, a power amplifier, and the like. The wireless communication interface 933 may be a one-chip module in which a memory that stores a communication control program, a processor that executes the communication control program, and related circuits are integrated. The wireless communication interface 933 may support other types of wireless communication schemes such as a short-range wireless communication scheme, a close proximity wireless communication scheme, and a cellular communication scheme, in addition to a wireless LAN scheme. The antenna switch 934 switches a connection destination of the antenna 935 among a plurality of circuits included in the wireless communication interface 933. The antenna 935 has a single or a plurality of antenna elements, and is used to transmit and receive a wireless signal by the wireless communication interface 933.

Note that the car navigation device 920 is not limited to the example of FIG. 17, and may include a plurality of antennas. In that case, the antenna switch 934 may be omitted from the configuration of the car navigation device 920.

The battery 938 supplies electric power to each block of the car navigation device 920 illustrated in FIG. 17 via a feeder line that is partially illustrated as a broken line in FIG. 17. In addition, the battery 938 accumulates electric power supplied from the vehicle.

In the car navigation device 920 illustrated in FIG. 17, the processor 921 may function as the control unit 220 of the STA 200 described with reference to FIG. 2. An operation of the processor 921 functioning as the control unit 220 is similar to that of the processor 901 of the smartphone 900 described with reference to FIG. 16.

In addition, the wireless communication interface 933 may operate as the AP 100 described above and provide a wireless connection to a terminal owned by a user boarding a vehicle. At that time, for example, the wireless communication interface 933 may allocate one resource unit to a plurality of terminals.

In addition, the technology of the present disclosure may also be realized as an in-vehicle system (or a vehicle) 940 including one or more blocks of the car navigation device 920 described above, the in-vehicle network 941, and a vehicle module 942. The vehicle module 942 generates vehicle data such as vehicle speed, engine speed, and trouble information, and outputs the generated data to the in-vehicle network 941.

3.3. Third Application Example

Figure 18:
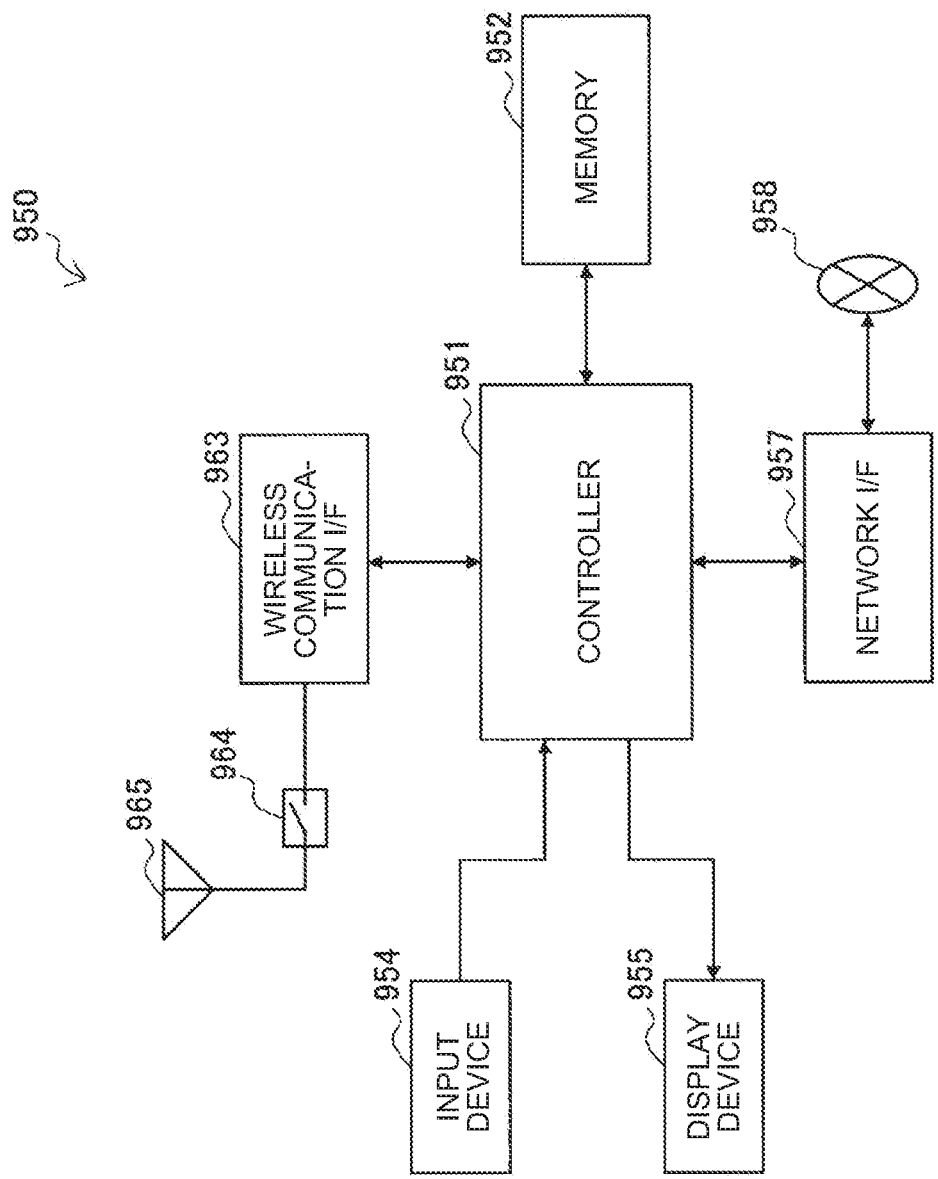
FIG. 18 is a block diagram illustrating an example of a schematic configuration of a radio access point.

FIG. 18 is a block diagram illustrating an example of a schematic configuration of a radio access point 950 to which the technology according to the present disclosure can be applied. The radio access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions (for example, access restriction, routing, encryption, firewall, log management, and the like) of an internet protocol (IP) layer of the radio access point 950 and a higher layer. The memory 952 includes a RAM and a ROM, and stores a program executed by the controller 951 and various control data (for example, terminal list, routing table, encryption key, security settings, log, and the like).

The input device 954 includes, for example, a button, a switch, or the like, and accepts an operation from a user. The display device 955 includes an LED lamp or the like, and displays an operation status of the radio access point 950.

The network interface 957 is a wired communication interface for connecting the radio access point 950 to a wired communication network 958. The network interface 957 may have a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, 11ad, and 11ax, and provides a wireless connection as an access point to nearby terminals. The wireless communication interface 963 can typically include a baseband processor, an RF circuit, a power amplifier, and the like. The wireless communication interface 963 may be a one-chip module in which a memory that stores a communication control program, a processor that executes the communication control program, and related circuits are integrated. The antenna switch 964 switches a connection destination of the antenna 965 among a plurality of circuits included in the wireless communication interface 963. The antenna 965 has a single or a plurality of antenna elements, and is used to transmit and receive a wireless signal by the wireless communication interface 963.

In the radio access point 950 illustrated in FIG. 18, the controller 951 may function as the control unit 120 of the AP 100 described with reference to FIG. 2. For example, the controller 951 may control the generation processing and the transmission processing of the data packet in which the data addressed to the plurality of STAs 200 are mixed with each other, respectively, in one resource unit. In addition, the controller 951 may allocate the plurality of STAs 200 to one resource unit, and control the generation processing and the transmission processing of the trigger including information regarding the allocation. Therefore, the controller 951 can realize more efficient communication in the wireless LAN system.

4. SUMMARY

As described above, the AP 100 according to the present disclosure can allocate the plurality of STAs 200 to one resource unit, and can thus realize more efficient communication in the wireless LAN system.

More specifically, the AP 100 according to the first embodiment can generate the data packet in which data addressed to the plurality of STAs 200 are mixed with each other, respectively, in one resource unit, and transmit the data packet to the STAs 200. At that time, the AP 100 stores the information (allocation information) for allocating the plurality of STAs 200 to one resource unit in the preamble part of the data packet. Therefore, the STA 200 can recognize the resource unit to which an own device is allocated by analyzing the preamble part in a case of receiving the data packet, and can thus appropriately perform reception processing of the data packet.

In addition, the AP 100 according to the second embodiment can generate the trigger in which the information (allocation information) for allocating the plurality of STAs 200 to one resource unit is stored, and transmit the trigger to each STA 200. Therefore, the plurality of STAs 200 can transmit the data packet to the AP 100 while sharing the resource unit with other STAs 200 on the basis of the trigger.

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

For example, the respective steps in the flowcharts described above do not necessarily need to be processed in time series in the order described. In other words, the respective steps in the flowcharts may be processed in order different from the order described or may be processed in parallel.

In addition, the effects described in the present specification are mere illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A wireless communication device that functions as an access point of a wireless local area network (LAN), the wireless communication device comprising:

a generation unit that generates a wireless signal in which allocation information for allocating a plurality of stations to one resource unit is stored; and a transmission unit that transmits the wireless signal to the stations.

(2)

The wireless communication device according to (1), wherein the allocation information is information for allocating the plurality of stations to at least one of resource units used for communication of a data packet or communication of an acknowledgment for the data packet.

(3)

The wireless communication device according to (2), wherein the communication of the data packet is downlink communication, and the generation unit generates a data packet in which data addressed to the plurality of stations are mixed with each other, respectively, in the one resource unit, as the wireless signal.

(4)

The wireless communication device according to (3), wherein the generation unit stores the allocation information in a preamble part of the data packet.

(5)

The wireless communication device according to (2), wherein the communication of the data packet is uplink communication, and the generation unit generates a trigger for controlling transmission of the data packet by the station, as the wireless signal.

(6)

The wireless communication device according to (5), further comprising:

a reception unit that receives a data packet in which data from the plurality of stations are mixed with each other in the one resource unit; and a reception processing unit that extracts data from at least one of the plurality of stations from the data packet by performing reception processing of the data packet on the basis of the allocation information.

(7)

The wireless communication device according to any one of (2) to (6), wherein in the allocation information, a resource unit used for the communication of the data packet and a resource unit used for the communication of the acknowledgment are different from each other.

(8)

The wireless communication device according to any one of (2) to (7), wherein the communication is orthogonal frequency division multiple access (OFDMA) communication conforming to IEEE 802.11 standard.

(9)

A wireless communication method that realizes an access point function of a wireless LAN, the wireless communication method comprising:

generating a wireless signal in which allocation information for allocating a plurality of stations to one resource unit is stored; and transmitting the wireless signal to the stations.

(10)

A wireless communication device that functions as a station of a wireless LAN, the wireless communication device comprising:

a reception unit that receives a wireless signal in which allocation information for allocating a plurality of stations to one resource unit is stored; and a reception processing unit that performs reception processing of the wireless signal on the basis of the allocation information.

(11)

The wireless communication device according to (10), wherein the allocation information is information for allocating the plurality of stations to at least one of resource units used for communication of a data packet or communication of an acknowledgment for the data packet.

(12)

The wireless communication device according to (11), wherein the communication of the data packet is downlink communication, and the reception processing unit extracts data addressed to an own device on the basis of the allocation information from a data packet that is the wireless signal in which data addressed to the plurality of stations are mixed with each other in the one resource unit.

(13)

The wireless communication device according to (12), wherein the reception processing unit extracts the data addressed to the own device on the basis of the allocation information stored in a preamble part of the data packet.

(14)

The wireless communication device according to (11), wherein the communication of the data packet is uplink communication, and the reception unit receives a trigger as the wireless signal, the wireless communication device further comprising a control unit that controls transmission of the data packet on the basis of the trigger.

(15)

The wireless communication device according to any one of (11) to (14), wherein in the allocation information, a resource unit used for the communication of the data packet and a resource unit used for the communication of the acknowledgment are different from each other.

(16)

The wireless communication device according to any one of (11) to (15), wherein the communication is OFDMA communication conforming to IEEE 802.11 standard.

(17)

A wireless communication method that realizes a station function of a wireless LAN, the wireless communication method comprising:

receiving a wireless signal in which allocation information for allocating a plurality of stations to one resource unit is stored; and performing reception processing of the wireless signal on the basis of the allocation information.

REFERENCE SIGNS LIST

100 AP
200 STA
110, 210 DATA PROCESSING UNIT
120, 220 CONTROL UNIT
130, 230 COMMUNICATION UNIT
131, 231 MODULATION/DEMODULATION UNIT
132, 232 SIGNAL PROCESSING UNIT
133, 233 CHANNEL ESTIMATION UNIT
134, 234 WIRELESS INTERFACE UNIT
135, 235 AMPLIFIER UNIT
140, 240 ANTENNA
150, 250 POWER SUPPLY UNIT

The invention claimed is:

1. A wireless communication device, comprising:
a generation unit configured to generate a wireless signal in which allocation information is stored, wherein
the allocation information is for allocation of a plurality of stations to at least one resource unit of a plurality of resource units,
the allocation information comprises:
first information that indicates allocation of at least one first resource unit of the plurality of resource units used for a communication of a data packet,
second information that indicates allocation of at least one second resource unit of the plurality of resource units used for a communication of an acknowledgment for the data packet,
third information that indicates a transmission timing of the data packet, and fourth information that indicates a transmission timing of the acknowledgment for the data packet by an access point, wherein
the transmission timing of the acknowledgment for the data packet corresponds to a time instant at which the access point transmits the acknowledgement, and
the wireless communication device serves as the access point, and
the at least one first resource unit is different from the at least one second resource unit; and
a transmission unit configured to generate transmit the wireless signal to the plurality of stations.

2. The wireless communication device according to claim 1, wherein
the communication of the data packet is downlink communication,
the generation unit is further configured to generate the data packet as the wireless signal, and
the data packet comprises data addressed to each station of the plurality of stations, respectively, in the at least one resource unit.

3. The wireless communication device according to claim 2, wherein the generation unit is further configured to store the allocation information in a preamble part of the data packet.

4. The wireless communication device according to claim 1, wherein
the communication of the data packet is uplink communication, and
the generation unit is further configured to generate a trigger, as the wireless signal, to control transmission of the data packet by at least one station of the plurality of stations.

5. The wireless communication device according to claim 4, further comprising:
a reception unit configured to receive the data packet in which data, from the plurality of stations, are mixed with another other in the at least one resource unit; and
a reception processing unit configured to extract first data from a first station of the plurality of stations from the data packet based on the allocation information.

6. The wireless communication device according to claim 1, wherein the communication of the data packet and the communication of the acknowledgment is orthogonal frequency division multiple access (OFDMA) communication conforming to IEEE 802.11 standard.

7. A wireless communication method, comprising:
generating a wireless signal in which allocation information is stored, wherein
the allocation information is for allocation of a plurality of stations to at least one resource unit of a plurality of resource units,
the allocation information comprises:
first information that indicates allocation of at least one first resource unit of the plurality of resource units used for a communication of a data packet,
second information that indicates allocation of at least one second resource unit of the plurality of resource units used for a communication of an acknowledgment for the data packet,
third information that indicates a transmission timing of the data packet, and
fourth information that indicates a transmission timing of the acknowledgment for the data packet by an access point, wherein
the transmission timing of the acknowledgment for the data packet corresponds to a time instant at which the access point transmits the acknowledgement, and
the at least one first resource unit is different from the at least one second resource unit; and
transmitting the wireless signal to the plurality of stations.

8. A wireless communication device, comprising:
a reception unit configured to receive a wireless signal in which allocation information is stored, wherein
the allocation information is for allocation of a plurality of stations to at least one resource unit of a plurality of resource units,
the allocation information comprises:
first information that indicates allocation of at least one first resource unit of the plurality of resource units used for a communication of a data packet,
second information that indicates allocation of at least one second resource unit of the plurality of resource units used for a communication of an acknowledgment for the data packet,
third information that indicates a transmission timing of the data packet, and
fourth information that indicates a transmission timing of the acknowledgment for the data packet by an access point, wherein
the transmission timing of the acknowledgment for the data packet corresponds to a time instant at which the access point transmits the acknowledgement, and
the at least one first resource unit is different from the at least one second resource unit; and
a reception processing unit configured to process of the wireless signal based on the allocation information.

9. The wireless communication device according to claim 8, wherein
the communication of the data packet is downlink communication,
the reception processing unit is further configured to extract a specific data addressed to the wireless communication device based on the allocation information from the data packet that is the wireless signal, and
the wireless signal includes data addressed to each station of the plurality of stations in the at least one resource unit.

10. The wireless communication device according to claim 9, wherein the reception processing unit is further configured to extract the data addressed to the wireless communication device based on the allocation information stored in a preamble part of the data packet.

11. The wireless communication device according to claim 8, wherein
the communication of the data packet is uplink communication,
the reception unit is further configured to receive a trigger as the wireless signal,
the wireless communication device further comprises a control unit configured to control transmission of the data packet based on the trigger.

12. The wireless communication device according to claim 8, wherein the communication of the data packet and the communication of the acknowledgment is OFDMA communication conforming to IEEE 802.11 standard.

13. A wireless communication method, comprising:
receiving a wireless signal in which allocation information is stored, wherein the allocation information is for allocation of a plurality of stations to at least one resource unit of a plurality of resource units,
the allocation information comprises:
  first information that indicates allocation of at least one first resource unit of the plurality of resource units used for a communication of a data packet,
  second information that indicates allocation of at least one second resource unit of the plurality of resource units used for a communication of an acknowledgment for the data packet,
  third information that indicates a transmission timing of the data packet, and
  fourth information that indicates a transmission timing of the acknowledgment for the data packet by an access point, wherein
    the transmission timing of the acknowledgment for the data packet corresponds to a time instant at which the access point transmits the acknowledgement, and
the at least one first resource unit is different from the at least one second resource unit; and
processing the wireless signal based on the allocation information.

* * * * *